(12) United States Patent
Xin et al.

(10) Patent No.: US 12,425,940 B2
(45) Date of Patent: Sep. 23, 2025

(54) COMMUNICATION METHOD AND DEVICE

(71) Applicant: Huawei Technologies Co., Ltd., Shenzhen (CN)

(72) Inventors: Tingyu Xin, Shenzhen (CN); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/901,413

(22) Filed: Sep. 1, 2022

(65) Prior Publication Data
US 2022/0417811 A1 Dec. 29, 2022

Related U.S. Application Data

(63) Continuation of application No. PCT/CN2020/130932, filed on Nov. 23, 2020.

(30) Foreign Application Priority Data

Mar. 2, 2020 (WO) ................ PCT/CN2020/077500

(51) Int. Cl.
*H04W 36/06* (2009.01)
*H04L 5/00* (2006.01)
(Continued)

(52) U.S. Cl.
CPC ........... *H04W 36/06* (2013.01); *H04L 5/0041* (2013.01); *H04W 36/008355* (2023.05); *H04W 36/16* (2013.01)

(58) Field of Classification Search
CPC ......... H04W 36/06; H04W 36/008355; H04W 36/16; H04W 48/12; H04W 8/22; H04W 36/0016; H04L 5/0041
See application file for complete search history.

(56) References Cited

U.S. PATENT DOCUMENTS

2013/0343319 A1  12/2013  Quan et al.
2016/0353371 A1  12/2016  Zhang et al.
(Continued)

FOREIGN PATENT DOCUMENTS

CN    102118833 A    7/2011
CN    105338519 A    2/2016
(Continued)

OTHER PUBLICATIONS

3rd Generation Partnership Project; Technical Specification Group Services and System Aspects; Service requirements for the 5G system; Stage 1 (Release 17), 3GPP TS 22.261, 83 Pages, Dec. 2019, V17.1.0.

(Continued)

*Primary Examiner* — Charles C Jiang
*Assistant Examiner* — Rachel Elizabeth Marks
(74) *Attorney, Agent, or Firm* — SLATER MATSIL, LLP

(57) ABSTRACT

Embodiments of this application provide a communication method and a device. The communication method and the device may be used in the field of a communication technology that supports a reduced capability terminal device, for example, weak-capability UE or MTC UE. The method includes: A first network device determines that a type of a first terminal device is a first type. The first network device sends a handover request message. The handover request message includes first indication information. The first indication information includes identifier information of the first type. The first network device receives a handover acknowledgment message or a handover preparation failure message.

16 Claims, 9 Drawing Sheets

(51) Int. Cl.
*H04W 36/00* (2009.01)
*H04W 36/16* (2009.01)

(56) References Cited

U.S. PATENT DOCUMENTS

| | | | | |
|---|---|---|---|---|
| 2019/0059049 | A1* | 2/2019 | Jang | H04W 4/70 |
| 2021/0045054 | A1* | 2/2021 | Liu | H04L 5/0048 |
| 2021/0227451 | A1* | 7/2021 | Babaei | H04W 48/12 |
| 2021/0235339 | A1* | 7/2021 | Babaei | H04W 36/06 |
| 2022/0330206 | A1* | 10/2022 | Li | H04W 68/025 |

FOREIGN PATENT DOCUMENTS

| | | | |
|---|---|---|---|
| CN | 106105329 A | | 11/2016 |
| CN | 107277870 A | | 10/2017 |
| CN | 109831805 A | | 5/2019 |
| IN | 201627011097 A | | 7/2016 |
| WO | 2014106334 A1 | | 7/2014 |

OTHER PUBLICATIONS

3rd Generation Partnership Project; Technical Specification Group Services and System Aspects; System architecture for the 5G System (5GS); Stage 2, (Release 16), 3GPP TS 23.501, 314 Pages, Dec. 2019, V16.3.0.

3rd Generation Partnership Project; Technical Specification Group Radio Access Network; NR; User Equipment (UE) radio transmission and reception; Part 1: Range 1 Standalone (Release 16), 3GPP TS 38.101-1, 251 Pages, Dec. 2019, V16.2.0.

3rd Generation Partnership Project; Technical Specification Group Radio Access Network; NR; Base Station (BS) radio transmission and reception (Release 16), 3GPP TS 38.104, 239 Pages, Dec. 2019, V16.2.0.

3rd Generation Partnership Project; Technical Specification Group Radio Access Network; NR; User Equipment (UE) procedures in Idle mode and RRC Inactive state (Release 15), 3GPP TS 38.304, 3GPP TS 38.304, 30 Pages, Dec. 2019, V15.6.0.

3rd Generation Partnership Project; Technical Specification Group Radio Access Network; NR; Medium Access Control (MAC) protocol specification (Release 15), 3GPP TS 38.321, 78 Pages, Dec. 2019, V15.8.0.

3rd Generation Partnership Project; Technical Specification Group Radio Access Network; NR; Radio Resource Control (RRC) protocol specification (Release 15), 3GPP TS 38.331, 532 Pages, Dec. 2019, Dec. 2019, V15.8.0.

3rd Generation Partnership Project; Technical Specification Group Radio Access Network; NG-RAN; Xn application protocol (XnAP) (Release 16), 3GPP TS 38.423, 330 Pages, Dec. 2019, V16.0.0.

3rd Generation Partnership Project; Technical Specification Group Radio Access Network; NG-RAN; F1 application protocol (F1AP) (Release 16), 3GPP TS 38.473, 239 Pages, Dec. 2019, V16.0.0.

Huawei, "Handover target selection for Category 0 UEs", 3GPP TSG RAN WG3#85, R3-141632, Aug. 18-22, 2014, 3 Pages, Dresden, Germany.

* cited by examiner

COMMUNICATION METHOD AND DEVICE

CROSS-REFERENCE TO RELATED APPLICATIONS

This application is a continuation of International Application No. PCT/CN2020/130932, filed on Nov. 23, 2020, which claims priority to International Patent Application No. PCT/CN2020/077500, filed on Mar. 2, 2020. The disclosures of the aforementioned applications are hereby incorporated by reference in their entireties.

TECHNICAL FIELD

This application relates to the field of communication technologies, and in particular, to a communication method and a device.

BACKGROUND

"Support of reduced capability NR devices" is one of new research fields proposed by the 3rd generation partnership project (3GPP) in Release 17. "Support of reduced capability NR devices" is a function of a scenario that supports a narrow bandwidth and a low peak data rate, and mainly provides lightweight communication for a high-end machine type communication (MTC) device. A terminal device that has a weak capability and that is applicable to this scenario may be referred to as reduced capability UE or weak-capability UE. In comparison with conventional UE, a bandwidth supported by the reduced capability UE is generally less than 20 MHz, a peak data rate supported by the reduced capability UE is generally from 5 Mb/s to 10 Mb/s, and a requirement on performance such as a delay and reliability is lowered. This type of device mainly includes a wearable device, a surveillance camera, an industrial sensor, and the like.

In a current new radio (NR) protocol, UE reports, by using a bitmap including 10 bits, an uplink bandwidth and a downlink bandwidth that are supported by the UE. The 10 bits respectively correspond to whether the UE supports bandwidths of 5 MHz, 10 MHz, 15 MHz, 20 MHz, 25 MHz, 30 MHz, 40 MHz, 50 MHz, 60 MHz and 80 MHz. Based on a requirement of the current protocol, all UEs need to support a bandwidth of 100 MHz. Therefore, although there is no bit that indicates whether the UE supports the bandwidth of 100 MHz in the bitmap reported by the UE, a legacy network device considers by default that the UE supports the bandwidth of 100 MHz. In other words, the legacy network device considers that bandwidths supported by the UE are the bandwidth reported by the UE in the bitmap and 100 MHz.

For the reduced capability UE, the reduced capability UE cannot support 100 MHz, and supports only the bandwidth reported in the bitmap. Therefore, if the reduced capability UE works in a cell of a network device in the current protocol, namely, the legacy network device, the network device incorrectly determines a capability of the reduced capability UE, for example, allocates, to the reduced capability UE, a BWP that is not in a bandwidth range supported by the reduced capability UE. Consequently, the reduced capability UE may not work normally.

SUMMARY

Embodiments of this application provide a communication method and a device, to prevent reduced capability UE from camping on a legacy network device, or prevent reduced capability UE from being handed over to a legacy network device.

According to a first aspect, an embodiment of this application provides a communication method. The method includes: A first network device determines that a type of a first terminal device is a first type. The first network device sends a handover request message. The handover request message includes first indication information. The first indication information includes identifier information of the first type. The first network device receives a handover acknowledgment message or a handover preparation failure message.

In the foregoing solution, the first network device includes the first indication information in the handover request message, and the first indication information includes the identifier information of the first type. In this way, after a second network device receives the handover request message, when the second network device does not support a terminal device of the first type, the second network device sends the handover preparation failure message to the first network device. When the second network device supports the terminal device of the first type, an existing handover procedure continues to be performed, and the second network device sends the handover acknowledgment message to the first network device when the second network device finally determines to agree to the handover. In the foregoing process, a terminal device of the first type can be prevented from being handed over to a network device that does not support the first type.

This application relates to a plurality of types of terminal devices, and the first type is one of the plurality of types. In an example, the plurality of types of the terminal devices may be classified based on capabilities of the terminal devices. Optionally, the plurality of types of the terminal devices may include the first type and a second type. A capability of a terminal device of the first type is weaker than a capability of a terminal device of the second type. For example, the terminal device of the first type may be reduced capability UE, and the terminal device of the second type is a terminal device whose capability is stronger than that of the reduced capability UE. For example, the terminal device of the second type may be legacy UE.

The identifier information of the first type is any information that can be used to identify the first type. In an example, the identifier information of the first type may be a name of the first type. In another example, different types may correspond to different indexes. In this case, the identifier information of the first type may be an index corresponding to the first type.

In a possible implementation, the first indication information further includes key-value indication information. The key-value indication information is used to indicate that the second network device rejects the handover in a first condition.

Optionally, the first condition may be that the second network device does not support the terminal device of the first type. "The second network device does not support the terminal device of the first type" herein may include two cases. In a first case, the second network device can identify the identifier information of the first type, but the second network device does not support the terminal device of the first type. In a second case, the second network device cannot identify the identifier information of the first type.

In an example, the handover request message includes a new IE or field. For example, a name of the new IE or field is reduced capability UE. The IE or field is used as the first indication information. The IE or field includes the identifier information of the first type and the key-value indication information. For example, the name of the IE or field is the identifier information of the first type, and a key value of the IE or field may be "reject" or "ignore", namely, the key-value indication information, indicating whether the second network device performs a rejection behavior or an ignoring behavior when the second network device cannot identify the IE or field or the identifier information carried in the IE or field.

For a handover scenario, assuming that the first terminal device that is currently to be handed over is reduced capability UE, when the first network device generates the handover request message, the key value of the IE or field is set to "reject". In this way, after the second network device receives the handover request message, if the second network device cannot identify the IE or field, the second network device rejects a handover behavior, and sends handover failure information to the first network device. If the second network device can identify the IE or field, the second network device may continue to perform the existing handover procedure, and send the handover acknowledgment message to the first network device when the second network device finally determines to agree to the handover. Therefore, the first network device can be effectively prevented from handing over the reduced capability UE to the legacy network device.

Optionally, the first network device may alternatively serve a second terminal device. The second terminal device is a terminal device of the second type (for example, legacy UE). In other words, the first network device may alternatively support the terminal device of the second type.

In a possible implementation, that the first network device receives a handover acknowledgment message or a handover preparation failure message includes: The first network device receives the handover acknowledgment message from the second network device, where the second network device supports the terminal device of the first type. Alternatively, the first network device receives a first handover preparation failure message from the second network device, where the first handover preparation failure message includes failure information corresponding to the first type, and the second network device does not support the terminal device of the first type.

In an example, a failure cause (failure cause value) carried in the first handover preparation failure message indicates that the handover fails because the first type is not supported.

In a possible implementation, that the first network device sends a handover request message includes: The first network device sends the handover request message to the second network device. Alternatively, the first network device sends the handover request message to the second network device by using an access and mobility management function AMF device.

For example, when an Xn interface connection is established between the first network device and the second network device, the first network device sends the handover request message to the second network device. When no Xn interface connection is established between the first network device and the second network device, the first network device and the second network device perform the handover procedure by using an NG interface. In other words, the first network device sends the handover request message to the second network device by using the AMF device.

In a handover scenario that is based on the NG interface, the first network device sends a handover required message to the AMF, and includes the first indication information (for example, the foregoing new IE or field) in the handover required message. For example, the first indication information may be added to fifth indication information that may be transparently transmitted to the AMF. The fifth indication information may be, for example, a Handover Required Transfer IE. Because the fifth indication information is a transparent IE for the AMF, the AMF does not interpret the fifth indication information, but directly includes the fifth indication information in the handover request message and sends the handover request message to the second network device. The second network device interprets all content included in the fifth indication information. If the second network device can identify the first indication information (for example, can identify the foregoing new IE/field, or can identify the identifier information carried in the new IE/field), an existing protocol continues to be performed, and the second network device sends the handover acknowledgment message to the AMF when the second network device finally determines to agree to the handover. The AMF sends a handover command message to the first network device. If the second network device cannot identify the first indication information (for example, cannot identify the foregoing new IE/field, or cannot identify the identifier information carried in the new IE/field), the second network device rejects the handover behavior, and sends the handover failure message to the AMF. The AMF sends the handover preparation failure message to the first network device.

According to a second aspect, an embodiment of this application provides a communication method. The method includes: A second network device receives a handover request message. The handover request message includes first indication information. The first indication information includes identifier information of a first type. The first type is a first type of a terminal device. Alternatively, the first type is a type of a first terminal device. The second network device sends a handover acknowledgment message or a handover preparation failure message.

In the foregoing solution, the handover request message includes the first indication information, and the first indication information includes the identifier information of the first type. In this way, after the second network device receives the handover request message, when the second network device does not support a terminal device of the first type, the second network device sends the handover preparation failure message to a first network device. When the second network device supports the terminal device of the first type, an existing handover procedure continues to be performed, and the second network device sends the handover acknowledgment message to the first network device when the second network device finally determines to agree to the handover. In the foregoing process, a terminal device of the first type can be prevented from being handed over to a network device that does not support the first type.

In a possible implementation, the handover request message further includes capability information of the first terminal device, and the type of the first terminal device is the first type.

The capability information may include one or more of the following: a maximum transmission bandwidth, a transmission rate, reliability, delay tolerance, a quantity of antennas, standby time, or the like.

In a possible implementation, the first indication information further includes key-value indication information. The key-value indication information is used to indicate that the second network device rejects the handover in a first condition.

In a possible implementation, that a second network device receives a handover request message includes: The second network device receives the handover request message sent by the first network device. Alternatively, the second network device receives the handover request message from the first network device by using an access and mobility management function AMF device.

According to a third aspect, an embodiment of this application provides a communication method. The method includes: A network device generates a system message. The system message includes second indication information. The second indication information is used to indicate a first type. The first type is a first type of a terminal device. The network device sends the system message.

In an application scenario of the foregoing solution, the network device may be a "network device that supports reduced capability UE".

The second indication information is used to indicate the first type. For example, a terminal device of the first type may be the reduced capability UE.

In a possible implementation, the system message is a system information block SIB1, and the second indication information is included in the SIB1.

In a possible implementation, the second indication information is used to indicate that a cell of the network device allows a terminal device of the first type to camp on. When the system message generated by the network device has/includes the second indication information, it indicates that the cell of the network device allows the terminal device of the first type to camp on. When the system message generated by the network device does not have/include the second indication information, it indicates that the cell of the network device does not allow the terminal device of the first type to camp on.

In a possible implementation, the second indication information is used to indicate whether a cell of the network device allows a terminal device of the first type to camp on. When the system message generated by the network device has/includes the second indication information, and a value of the second indication information is a first preset value, it indicates that the cell of the network device allows the terminal device of the first type to camp on. When the system message generated by the network device has/includes the second indication information, and the value of the second indication information is a second preset value, it indicates that the cell of the network device does not allow the terminal device of the first type to camp on. When the system message generated by the network device does not have/include the second indication information, it indicates that the cell of the network device does not allow the terminal device of the first type to camp on.

In the foregoing solution, the second indication information is included in the system message, and the second indication information indicates that the cell of the network device allows the terminal device of the first type to camp on, or indicates whether the cell of the network device allows the terminal device of the first type to camp on. In this way, the terminal device may determine, based on the second indication information in the system message, whether camping on the cell of the network device is allowed. For the reduced capability UE, if it is determined, based on the received system message, that the network device does not allow the reduced capability UE to camp on, the reduced capability UE does not camp on the cell of the network device. Only when it is determined that the network device allows the reduced capability UE to camp on, the cell of the network device is used as a candidate object for cell selection. Therefore, the reduced capability UE can be prevented from camping on the legacy network device.

In a possible implementation, the second indication information may further be used to indicate whether the cell of the network device allows the terminal device of the first type to perform intra-frequency reselection.

Optionally, the network device indicates, by using that the system message has/includes the second indication information, that the cell of the network device allows the terminal device of the first type to perform intra-frequency reselection.

Optionally, when that the system message has/includes the second indication information indicates that the network device allows the terminal device of the first type to camp on, the value of the second indication information may be used to indicate whether the cell of the network device allows the terminal device of the first type to perform intra-frequency reselection. When the value of the second indication information is a first preset value, it indicates that the cell of the network device allows the terminal device of the first type to perform intra-frequency reselection. When the value of the second indication information is a second preset value, it indicates that the cell of the network device does not allow the terminal device of the first type to perform intra-frequency reselection.

Optionally, the second indication information and sixth indication information may be used to indicate whether the cell of the network device allows the terminal device of the first type to perform intra-frequency reselection. The sixth indication information may be indication information used to indicate whether the cell of the network device allows a terminal device (where the terminal device herein may be legacy UE) to perform intra-frequency reselection.

The sixth indication information and the second indication information may be included in a same system message, or may be included in different system messages.

When the system message has/includes the second indication information, if the sixth indication information indicates that the cell of the network device allows a terminal device (where the terminal device herein may be legacy UE) to perform intra-frequency reselection, it indicates that the cell of the network device allows the terminal device of the first type to perform intra-frequency reselection. If the sixth indication information indicates that the cell of the network device does not allow a terminal device (where the terminal device herein may be legacy UE) to perform intra-frequency reselection, it indicates that the cell of the network device does not allow the terminal device of the first type to perform intra-frequency reselection. When the system message does not have/include the second indication information, it indicates that the cell of the network device does not allow the terminal device of the first type to perform intra-frequency reselection. In this case, a value of the sixth indication information does not need to be considered.

In the foregoing solution, the second indication information is further used to indicate whether the cell of the network device allows the terminal device of the first type to perform intra-frequency reselection. In this way, the terminal device determines, based on the second indication information, whether intra-frequency reselection is allowed. For the reduced capability UE, if it is determined, based on the received system information, that the network device does not allow the reduced capability UE to perform intra-frequency reselection, the reduced capability UE does not perform intra-frequency reselection. Only when it is determined that the network device allows the reduced capability UE to perform intra-frequency reselection, the reduced capability UE considers the intra-frequency reselection. Therefore, the reduced capability UE can be prevented from reselecting the legacy network device.

According to a fourth aspect, an embodiment of this application provides a communication method. The method includes: A first terminal device receives a system message from a network device. The first terminal device obtains second indication information from the system message. The second indication information is used to indicate a first type. The first type is a first type of a terminal device.

The first terminal device may be a terminal device of the first type. For example, the first terminal device may be reduced capability UE. "Obtain" in "the first terminal device obtains second indication information from the system message" is an action of obtaining the second indication information from the system message by the first terminal device. A result of obtaining may include that the second indication information is obtained and that the second indication information fails to be obtained.

In a possible implementation, the system message is a system information block SIB1.

In a possible implementation, the first terminal device determines, depending on whether the second indication information is obtained from the system message (in other words, depending on whether the system message has/includes the second indication information), whether the first terminal device is allowed to camp on a cell of the network device.

Optionally, when the first terminal device obtains the second indication information from the system message (in other words, the system message has/includes the second indication information), it is determined that the first terminal device is allowed to camp on the cell of the network device. Alternatively, when the first terminal device fails to obtain the second indication information from the system message (in other words, the system message does not have/include the second indication information), it is determined that the first terminal device is not allowed to camp on the cell of the network device.

In a possible implementation, when the first terminal device obtains the second indication information from the system message (in other words, the system message has/includes the second indication information), it indicates that the network device is a "network device that supports reduced capability UE". In this case, the first terminal device determines, based on the second indication information obtained from the system message, whether the first terminal device is allowed to camp on the cell of the network device.

Optionally, if the second indication information indicates that the cell of the network device allows the terminal device of the first type to camp on, the first terminal device determines that the first terminal device is allowed to camp on the cell of the network device. If the second indication information indicates that the cell of the network device does not allow the terminal device of the first type to camp on, the first terminal device determines that the first terminal device is not allowed to camp on the cell of the network device.

When the first terminal device fails to obtain the second indication information from the system message (in other words, the system message does not have/include the second indication information), it indicates that the network device is a legacy network device. In this case, the first terminal device determines that the first terminal device is not allowed to camp on the cell of the network device.

In a possible implementation, the first terminal device may further determine, based on the second indication information, whether intra-frequency reselection is allowed.

Optionally, the first terminal device determines, based on that the system message has/includes the second indication information, that the cell of the network device allows the first terminal device to perform intra-frequency reselection. In other words, the first terminal device determines, based on that the second indication information is obtained from the system message, that the cell of the network device allows the first terminal device to perform intra-frequency reselection.

The first terminal device determines, based on that the system message does not have/include the second indication information, that the cell of the network device does not allow the first terminal device to perform intra-frequency reselection. In other words, the first terminal device determines, based on that the second indication information fails to be obtained from the system message, that the cell of the network device does not allow the first terminal device to perform intra-frequency reselection.

Optionally, when the first terminal device obtains the second indication information from the system message, if the second indication information indicates that the cell of the network device allows the terminal device of the first type to perform intra-frequency reselection (for example, a value of the second indication information is a first preset value), the first terminal device determines that the cell of the network device allows the first terminal device to perform intra-frequency reselection. If the second indication information indicates that the cell of the network device does not allow the terminal device of the first type to perform intra-frequency reselection (for example, the value of the second indication information is a second preset value), the first terminal device determines that the cell of the network device does not allow the first terminal device to perform intra-frequency reselection.

Optionally, the first terminal device may further receive sixth indication information from the network device. When the system message has/includes the second indication information (in other words, the first terminal device obtains the second indication information from the system message), the first terminal device determines, based on the sixth indication information, whether the cell of the network device allows the first terminal device to perform intra-frequency reselection.

The sixth indication information and the second indication information may be included in a same system message, or may be included in different system messages.

When the system message has/includes the second indication information (in other words, the first terminal device obtains the second indication information from the system message), that is, the network device is the "network device that supports reduced capability UE", and the sixth indication information indicates that the cell of the network device allows a terminal device (where the terminal device herein may be legacy UE) to perform intra-frequency reselection, the first terminal device determines that the cell of the network device allows the first terminal device to perform intra-frequency reselection.

When the system message has/includes the second indication information (in other words, the first terminal device obtains the second indication information from the system message), and the sixth indication information indicates that the cell of the network device does not allow a terminal device (where the terminal device herein may be legacy UE) to perform intra-frequency reselection, the first terminal device determines that the cell of the network device does not allow the first terminal device to perform intra-frequency reselection.

When the system message does not have/include the second indication information (in other words, the first terminal device fails to obtain the second indication information from the system message), that is, the network device is the legacy network device, the first terminal device determines that the cell of the network device does not allow the first terminal device to perform intra-frequency reselection.

In a possible implementation, the system message further includes frequency band information and bandwidth information that are supported by the network device. The first terminal device determines, depending on whether the second indication information is obtained from the system message, and the frequency band information and the bandwidth information that are supported by the network device, whether the first terminal device is allowed to camp on the cell of the network device.

Alternatively, the first terminal device determines, based on the second indication information, and the frequency band information and the bandwidth information that are supported by the network device, whether the first terminal device is allowed to camp on the cell of the network device.

In the foregoing implementations, the second indication information is included in the system message, and the second indication information indicates that the cell of the network device allows the terminal device of the first type to camp on, or indicates whether the cell of the network device allows the terminal device of the first type to camp on. In this way, the terminal device may determine, based on the second indication information in the system message, whether camping on the cell of the network device is allowed. For the reduced capability UE, if it is determined, based on the received system message, that the network device does not allow the reduced capability UE to camp on, the reduced capability UE does not camp on the cell of the network device. Only when it is determined that the network device allows the reduced capability UE to camp on, the cell of the network device is used as a candidate object for cell selection. Therefore, the reduced capability UE can be prevented from camping on the legacy network device.

In the foregoing implementations, the second indication information is further used to indicate whether the cell of the network device allows the terminal device of the first type to perform intra-frequency reselection. In this way, the terminal device determines, based on the second indication information, whether intra-frequency reselection is allowed. For the reduced capability UE, if it is determined, based on the received system information, that the network device does not allow the reduced capability UE to perform intra-frequency reselection, the reduced capability UE does not perform intra-frequency reselection. Only when it is determined that the network device allows the reduced capability UE to perform intra-frequency reselection, the reduced capability UE considers the intra-frequency reselection. Therefore, the reduced capability UE can be prevented from reselecting the legacy network device.

In a possible implementation, the network device is a network device corresponding to a neighbor cell of a serving cell of a first terminal device. The method further includes: The first terminal device sends the second indication information to a network device corresponding to the serving cell. Alternatively, the first terminal device sends, to a second network device, a determining result corresponding to the second indication information. The determining result is a result obtained by the first terminal device by determining, based on the second indication information, whether a first network device supports the terminal device of the first type.

Optionally, the first terminal device carries the second indication information or the determining result corresponding to the second indication information in a CGI procedure report or a measurement report for sending.

In an example, the first terminal device sends, to the second network device, a detected PCI of a first cell. If the second network device discovers that the PCI that is reported by the first terminal device and that is of the first cell cannot be identified, the second network device indicates the first terminal device to obtain neighbor cell information corresponding to the PCI. The first terminal device receives an SIB1 of the first cell, and generates the CGI procedure report based on the neighbor cell information obtained by parsing the SIB1. The first terminal device sends the CGI procedure report to the second network device.

In the foregoing example, the CGI procedure report includes one or more of a PLMN list, RANAC, TAC, a cell ID, a frequency band list, and the second indication information. The second indication information in the SIB1 is added to the CGI procedure report, so that there is no delay that is caused by measurement or reading of information related to another neighbor cell.

In the foregoing example, when initiating handover, the second network device selects a target network device by using, as a determining condition, the information obtained from the CGI procedure report, including information indicating that another network device supports the reduced capability UE or information about whether another network device supports the reduced capability UE. Therefore, the reduced capability UE may be prevented from being handed over to the legacy network device.

According to a fifth aspect, an embodiment of this application provides a communication method. The method includes: A first terminal device generates capability information. The capability information includes third indication information. The third indication information is used to indicate a type of a first terminal device. The type of the first terminal device is a first type or a second type. The first terminal device sends the capability information to a network device.

In a possible implementation, before the first terminal device generates the capability information, the method further includes: The first terminal device receives a capability request message from the network device.

In the foregoing implementation, the first terminal device includes the third indication information in the capability information, to indicate the type of the first terminal device, so that the network device can determine the type of the first terminal device based on the received capability information. Therefore, the network device may use different processing manners based on the type of the first terminal device. For example, if the type of the first terminal device is the first type (reduced capability UE), it is considered that a bandwidth supported by the first terminal device is a bandwidth reported by the first terminal device by using a bitmap or in another form. When the first terminal device needs to be handed over, the first terminal device is handed over to a network device that supports the reduced capability UE. If the type of the first terminal device is the second type (for example, legacy UE), it is considered that the bandwidth of the first terminal device is a bandwidth sum 100 MHz that is reported by the first terminal device by using a bitmap or in another form.

According to a sixth aspect, an embodiment of this application provides a communication method. The method includes: A network device receives capability information from a first terminal device. The capability information includes third indication information. The network device determines, based on the third indication information, that a type of the first terminal device is a first type or a second type.

In a possible implementation, before the network device receives the capability information from the first terminal device, the method further includes: The network device sends a capability request message to the first terminal device.

In the foregoing implementation, the first terminal device includes the third indication information in the capability information, to indicate the type of the first terminal device, so that the network device can determine the type of the first terminal device based on the received capability information. Therefore, the network device may use different processing manners based on the type of the first terminal device. For example, if the type of the first terminal device is the first type (reduced capability UE), it is considered that a bandwidth supported by the first terminal device is a bandwidth reported by the first terminal device by using a bitmap or in another form. When the first terminal device needs to be handed over, the first terminal device is handed over to a network device that supports the reduced capability UE. If the type of the first terminal device is the second type (for example, legacy UE), it is considered that the bandwidth of the first terminal device is a bandwidth sum 100 MHz that is reported by the first terminal device by using a bitmap or in another form.

According to a seventh aspect, an embodiment of this application provides a communication method. The method includes: A first network device sends an Xn interface setup request message to a second network device. The Xn interface setup request message includes query information, and the query information is used to query whether the second network device supports a terminal device of a first type. The first network device receives an Xn interface setup response message or an Xn interface setup failure message from the second network device. The Xn interface setup response message includes fourth indication information, and the fourth indication information is used to indicate whether the second network device supports the terminal device of the first type.

According to an eighth aspect, an embodiment of this application provides a communication method. The method includes: A second network device receives an Xn interface setup request message from a first network device. The Xn interface setup request message includes query information, and the query information is used to query whether the second network device supports a terminal device of a first type. The second network device sends an Xn interface setup response message or an Xn interface setup failure message to the first network device. The Xn interface setup response message includes fourth indication information, and the fourth indication information is used to indicate whether the second network device supports the terminal device of the first type.

In this solution, the Xn interface setup response message includes the fourth indication information, so that the first network device can learn, based on the fourth indication information, whether the second network device supports the terminal device of the first type. The first network device may further store the fourth indication information. When the first network device needs to initiate handover to the terminal device of the first type, the first network device may determine, based on stored fourth indication information of each network device, a target network device to which the terminal device of the first type is to be handed over. Therefore, the terminal device of the first type is prevented from being handed over to a network device that does not support the first type.

According to a ninth aspect, an embodiment of this application provides a communication apparatus. The communication apparatus may be a first network device or an element in the first network device, for example, a chip or an integrated circuit. The communication apparatus may include a processing unit, a sending unit, and a receiving unit. The processing unit is configured to determine that a type of a first terminal device is a first type. The sending unit is configured to send a handover request message. The handover request message includes first indication information, and the first indication information includes identifier information of the first type. The receiving unit is configured to receive a handover acknowledgment message or a handover preparation failure message.

In a possible implementation, the first indication information further includes key-value indication information. The key-value indication information is used to indicate that a second network device rejects the handover in a first condition.

In a possible implementation, the receiving unit is specifically configured to receive the handover acknowledgment message from the second network device, where the second network device supports a terminal device of the first type; or receive a first handover preparation failure message from the second network device, where the first handover preparation failure message includes failure information corresponding to the first type, and the second network device does not support a terminal device of the first type.

In a possible implementation, the sending unit is specifically configured to send the handover request message to the second network device; or send the handover request message to the second network device by using an access and mobility management function AMF device.

According to a tenth aspect, an embodiment of this application provides a communication apparatus. The communication apparatus may serve as a second network device. The communication apparatus may include a receiving unit and a sending unit. The receiving unit is configured to receive a handover request message. The handover request message includes first indication information. The first indication information includes identifier information of a first type. The first type is a first type of a terminal device, or the first type is a type of a first terminal device. The sending unit is configured to send a handover acknowledgment message or a handover preparation failure message.

In a possible implementation, the handover request message further includes capability information of the first terminal device, and the type of the first terminal device is the first type.

In a possible implementation, the first indication information further includes key-value indication information. The key-value indication information is used to indicate that the second network device rejects the handover in a first condition.

In a possible implementation, the receiving unit is specifically configured to receive the handover request message sent by a first network device; or receive the handover request message from a first network device by using an access and mobility management function AMF device.

According to an eleventh aspect, an embodiment of this application provides a communication apparatus. The communication apparatus may include a processing unit and a sending unit. The processing unit is configured to generate a system message. The system message includes second indication information. The second indication information is used to indicate a first type. The first type is a first type of a terminal device. The sending unit is configured to send the system message.

In a possible implementation, the second indication information is used to indicate that a cell of a network device allows a terminal device of the first type to camp on.

In a possible implementation, the second indication information is used to indicate whether a cell of a network device allows a terminal device of the first type to camp on.

In a possible implementation, the second indication information is further used to indicate whether the cell of the network device allows the terminal device of the first type to perform intra-frequency reselection.

In a possible implementation, the system message is a system information block SIB1.

According to a twelfth aspect, an embodiment of this application provides a communication apparatus. The communication apparatus may be a first terminal device or an element in the first terminal device, for example, a chip or an integrated circuit. The communication apparatus may include a receiving unit and a processing unit. The receiving unit is configured to receive a system message from a network device. The processing unit is configured to obtain second indication information from the system message. The second indication information is used to indicate a first type. The first type is a first type of a terminal device.

In a possible implementation, the system message is a system information block SIB1.

In a possible implementation, the processing unit is further configured to determine, depending on whether the second indication information is obtained from the system message, whether camping on a cell of the network device is allowed; or determine, based on the second indication information obtained from the system message, whether camping on a cell of the network device is allowed.

In a possible implementation, the processing unit is specifically configured to obtain the second indication information from the system message, and determine that camping on the cell of the network device is allowed; or obtain no second indication information from the system message, and determine that camping on the cell of the network device is not allowed.

In a possible implementation, the processing unit is specifically configured to: when the second indication information indicates that the cell of the network device allows a terminal device of the first type to camp on, determine that camping on the cell of the network device is allowed; or when the second indication information indicates that the cell of the network device does not allow a terminal device of the first type to camp on, determine that camping on the cell of the network device is not allowed.

In a possible implementation, the processing unit is further configured to determine, based on the second indication information, whether intra-frequency reselection is allowed.

In a possible implementation, the processing unit is further specifically configured to: when the system message has the second indication information, and sixth indication information indicates that the intra-frequency reselection is allowed in the cell of the network device, determine that the intra-frequency reselection is allowed; or when the system message has the second indication information, and sixth indication information indicates that the intra-frequency reselection is not allowed in the cell of the network device, determine that the intra-frequency reselection is not allowed.

In a possible implementation, the system message further includes frequency band information and bandwidth information that are supported by the network device. The processing unit is specifically configured to determine, depending on whether the second indication information is obtained from the system message, and the frequency band information and the bandwidth information that are supported by the network device, whether camping on the cell of the network device is allowed; or determine, based on the second indication information, and the frequency band information and the bandwidth information that are supported by the network device, whether camping on the cell of the network device is allowed.

In a possible implementation, the network device is a network device corresponding to a neighbor cell of a serving cell of the first terminal device. The communication apparatus further includes a sending unit. The sending unit is configured to send the second indication information to a network device corresponding to the serving cell.

According to a thirteenth aspect, an embodiment of this application provides a communication apparatus. The communication apparatus may be a first terminal device or an element in the first terminal device, for example, a chip or an integrated circuit. The communication apparatus may include a processing unit and a sending unit. The processing unit is configured to generate capability information. The capability information includes third indication information. The third indication information is used to indicate a type of a first terminal device. The type of the first terminal device is a first type or a second type. The sending unit is configured to send the capability information to a network device.

In a possible implementation, the communication apparatus further includes a receiving unit. The receiving unit is configured to receive a capability request message from the network device.

According to a fourteenth aspect, an embodiment of this application provides a communication apparatus. The communication apparatus may include a receiving unit and a processing unit. The receiving unit is configured to receive capability information from a first terminal device. The capability information includes third indication information. The processing unit is configured to determine, based on the third indication information, that a type of the first terminal device is a first type or a second type.

In a possible implementation, the communication apparatus further includes a sending unit. The sending unit is configured to send a capability request message to the first terminal device.

According to a fifteenth aspect, an embodiment of this application provides a communication apparatus. The communication apparatus may be a first network device or an element in the first network device, for example, a chip or an integrated circuit. The communication apparatus may include a sending unit and a receiving unit. The sending unit is configured to send an Xn interface setup request message to a second network device. The Xn interface setup request message includes query information, and the query information is used to query whether the second network device supports a terminal device of a first type. The receiving unit is configured to receive an Xn interface setup response message or an Xn interface setup failure message from the second network device. The Xn interface setup response message includes fourth indication information, and the fourth indication information is used to indicate whether the second network device supports the terminal device of the first type.

According to a sixteenth aspect, an embodiment of this application provides a communication apparatus. The communication apparatus may be a second network device or an element in the second network device, for example, a chip or an integrated circuit. The communication apparatus may include a receiving unit and a sending unit. The receiving unit is configured to receive an Xn interface setup request message from a first network device. The Xn interface setup request message includes query information, and the query information is used to query whether the second network device supports a terminal device of a first type. The sending unit is configured to send an Xn interface setup response message or an Xn interface setup failure message to the first network device. The Xn interface setup response message includes fourth indication information, and the fourth indication information is used to indicate whether the second network device supports the terminal device of the first type.

According to a seventeenth aspect, an embodiment of this application provides a communication apparatus, including at least one memory and at least one processor. The at least one memory is configured to store a computer program, and the at least one processor is configured to invoke the computer program from the at least one memory and run the computer program, to enable the at least one processor to run the computer program to perform the communication method in any one of the first aspect, the second aspect, the third aspect, the sixth aspect, the seventh aspect, or the eighth aspect.

According to an eighteenth aspect, an embodiment of this application provides a communication apparatus, including at least one memory and at least one processor. The at least one memory is configured to store a computer program, and the at least one processor is configured to invoke the computer program from the at least one memory and run the computer program, to enable the at least one processor to run the computer program to perform the communication method in any one of the fourth aspect or the fifth aspect.

According to a nineteenth aspect, an embodiment of this application provides a computer storage medium. The computer storage medium includes a computer program, and the computer program is used to implement the communication method in any one of the first aspect, the second aspect, the third aspect, the sixth aspect, the seventh aspect, or the eighth aspect, or the communication method in any one of the fourth aspect or the fifth aspect.

According to a twentieth aspect, an embodiment of this application provides a chip or a chip system. The chip or the chip system includes at least one processor and a communication interface, and the communication interface and the at least one processor are connected by using a line. The at least one processor is configured to run a computer program or instructions, to perform the communication method in any one of the first aspect, the second aspect, the third aspect, the sixth aspect, the seventh aspect, or the eighth aspect, or the communication method in any one of the fourth aspect or the fifth aspect.

The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

According to a twenty-first aspect, an embodiment of this application provides a communication system. The communication system includes the communication apparatus in any one of the ninth aspect and the communication apparatus in any one of the tenth aspect.

Alternatively, the communication system includes the communication apparatus in any one of the eleventh aspect and the communication apparatus in any one of the twelfth aspect.

Alternatively, the communication system includes the communication apparatus in any one of the thirteenth aspect and the communication apparatus in any one of the fourteenth aspect.

Alternatively, the communication system includes the communication apparatus in any one of the fifteenth aspect and the communication apparatus in any one of the sixteenth aspect.

DETAILED DESCRIPTION OF ILLUSTRATIVE EMBODIMENTS

The solutions in embodiments of this application may be applied to various communication systems. Specifically, the communication system may be, for example, a global system for mobile communications (GSM) system, a code division multiple access (CDMA) system, a wideband code division multiple access (WCDMA) system, a general packet radio service (GPRS) system, a long term evolution (LTE) system, a long term evolution-advanced LTE-A (LTE-advanced) system, an LTE frequency division duplex (FDD)

system, an LTE time division duplex (TDD), a universal mobile telecommunications system (UMTS), a 5th generation mobile network (5G for short) communication system, a new radio (NR) communication system, a future 6th generation mobile network (6G for short) communication system, or even a higher-level communication system.

A possible network architecture in embodiments of this application is described below with reference to FIG. 1A and FIG. 1B. It should be noted that the network architecture and a service scenario that are described in embodiments of this application are intended to describe the technical solutions in embodiments of this application, and do not constitute a limitation on the technical solutions provided in embodiments of this application. A person of ordinary skill in the art may learn that with evolution of the network architecture and emergence of a new service scenario, the technical solutions provided in embodiments of this application are also applicable to a similar technical problem.

Figure 1A:
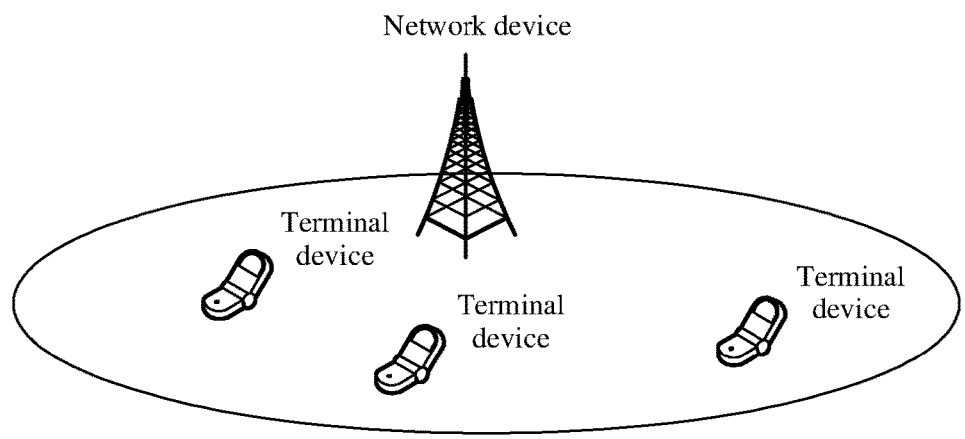
FIG. 1A is a schematic diagram of a possible network architecture according to an embodiment of this application.

FIG. 1A is a schematic diagram of a possible network architecture according to an embodiment of this application. As shown in FIG. 1A, the network architecture includes a network device and a terminal device. The terminal device may camp on a cell of the network device by using a cell selection procedure.

Figure 1B:
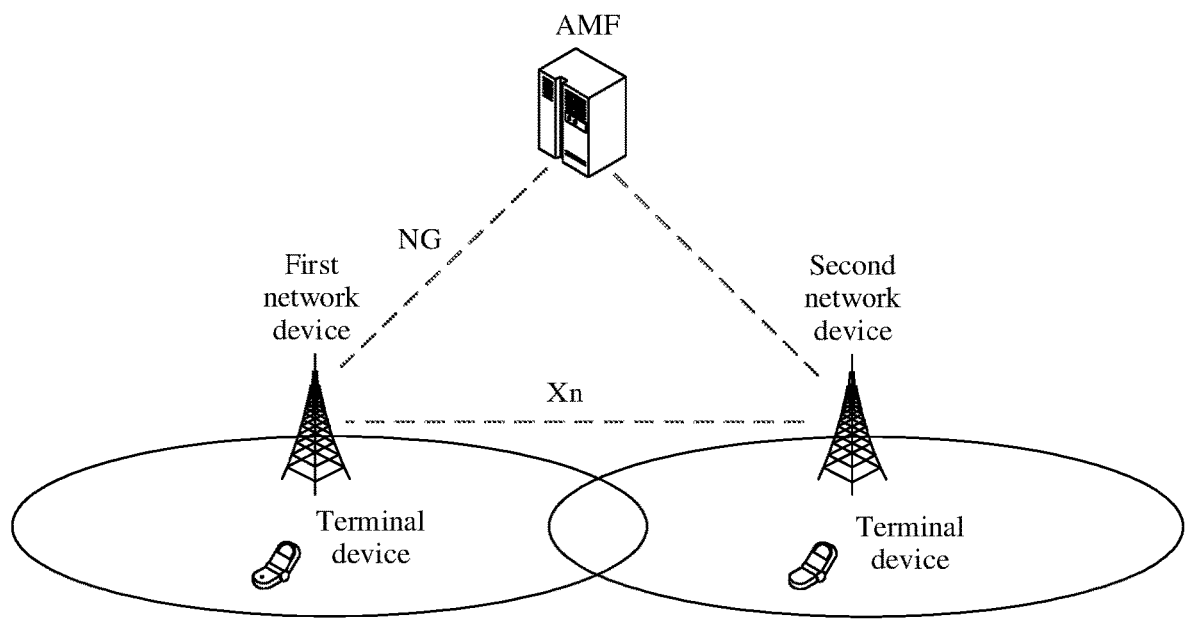
FIG. 1B is a schematic diagram of another possible network architecture according to an embodiment of this application.

FIG. 1B is a schematic diagram of another possible network architecture according to an embodiment of this application. As shown in FIG. 1B, the network architecture includes an access and mobility management function (AMF), a first network device, a second network device, and a terminal device. The first network device communicates with the second network device through an Xn interface, and the AMF communicates with the network devices through an NG interface. When the terminal device in a connected mode moves from coverage of the first network device to coverage of the second network device, to ensure communication continuity and quality of service of the terminal device, a communication system may transfer a communication link between the terminal device and an original cell (a cell of the first network device) to a new cell (a cell of the second network device). The foregoing process is referred to as handover. The handover may be classified into handover that is based on an Xn interface and handover that is based on an NG interface. In other words, the handover may be directly performed between the two network devices. When the Xn interface cannot be set up, the two network devices may alternatively exchange handover signaling by using the AMF.

The network device in embodiments of this application may be a device that connects a terminal to a wireless network. The device may be a base station or various wireless access points, or may be a device in communication with the terminal device via one or more sectors at an air interface in an access network. The base station may be configured to mutually convert a received over-the-air frame and an IP packet and serve as a router between the terminal device and a rest portion of the access network, where the rest portion of the access network may include an Internet protocol (IP) network. The base station may coordinate attribute management of the air interface. For example, the base station may be a base transceiver station (BTS) in global system for mobile communications (GSM) or code division multiple access (CDMA), a NodeB (NB) in wideband code division multiple access (WCDMA), an evolved NodeB (eNB or eNodeB) in long term evolution (LTE), a relay station or an access point, a gNB gNB in a 5G network, a transmission reception point (TRP) in an NR network, a next generation NodeB (gNB), or a base station in another future network system. This is not limited thereto.

The terminal device in embodiments of this application may be a wireless terminal or a wired terminal. The wireless terminal may refer to a device that provides a user with voice and/or other service data connectivity, a handheld device with a wireless connection function, or another processing device connected to a radio modem. The wireless terminal may communicate with one or more core networks through a radio access network. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device (user device or user equipment). This is not limited thereto.

With evolution of a communication protocol and diversification of application scenarios, there are a plurality of types of terminal devices. For example, a new research field "support of reduced capability NR devices" proposed by the 3GPP in Release 17 is a function of a scenario that supports a narrow bandwidth and a low peak data rate, and mainly provides lightweight communication for a high-end machine type communication (MTC) device. A terminal device that has a weak capability and that is applicable to this scenario may be referred to as reduced capability UE or weak-capability UE. This type of device mainly includes a wearable device, a surveillance camera, an industrial sensor, and the like.

For ease of description, in embodiments of this application, a terminal device with a strong capability is referred to as conventional UE, or may be referred to as normal/legacy UE. Compared with legacy UE, reduced capability UE is a type of a terminal device that is with low costs and low complexity and that is more energy-saving. A capability of the terminal device includes one or more of the following: a maximum transmission bandwidth, a transmission rate, reliability, delay tolerance, a quantity of antennas, standby time, or the like. Different types of terminal devices have different capabilities. For example, in embodiments of this application, the reduced capability UE has one or more of the following features.

(1) Compared with the legacy UE, the reduced capability UE supports a narrower bandwidth, and the narrower bandwidth is a bandwidth less than a preset threshold. Optionally, the threshold is 100 MHz. One type supports a maximum bandwidth of 20 MHz, and another type supports a maximum bandwidth of 5 MHz. It should be noted that the foregoing classification of the reduced capability UE is merely an example for description, and is not limited.

(2) Compared with the legacy UE, the reduced capability UE supports a reduced peak data rate, for example, generally from 5 Mb/s to 10 Mb/s.

(3) Compared with the legacy UE, in a case of a same subcarrier spacing (SCS) and in which a specific physical resource block (PRB) is supported, a bandwidth supported by the reduced capability UE is decreased. For example, it is assumed that a quantity of supported physical resource blocks is 24, and a subcarrier spacing is 15 kHz. In this case, the reduced capability UE supports a 5 MHz RF bandwidth, where the bandwidth is less than a bandwidth of the legacy UE in Release 15. The legacy UE in Release 15 supports a bandwidth of 100 MHz.

In a current NR protocol (Release 15 protocol), a terminal device reports, to a network device by using a bitmap including 10 bits, an uplink bandwidth and a downlink bandwidth that are supported by the terminal device. The 10 bits respectively correspond to whether the terminal device supports bandwidths of 5 MHz, 10 MHz, 15 MHz, 20 MHz, 25 MHz, 30 MHz, 40 MHz, 50 MHz, 60 MHz and 80 MHz. Based on a requirement of the current protocol, all terminal devices need to support a bandwidth of 100 MHz. Therefore, although there is no bit that indicates whether the terminal device supports the bandwidth of 100 MHz in the bitmap reported by the terminal device, the network device considers by default that the terminal device supports the bandwidth of 100 MHz. In other words, the network device considers that bandwidths supported by the terminal device are the bandwidth reported by the terminal device in the bitmap and 100 MHz.

For the reduced capability UE, the reduced capability UE cannot support 100 MHz, and supports only the bandwidth reported in the bitmap. Therefore, if the reduced capability UE works in a network device that currently does not support NR Light, the network device may overestimate a capability of the reduced capability UE because the network device considers by default that this type of UE supports the bandwidth of 100 MHz. The network device may allow the reduced capability UE to work in a network and allocate a resource to the reduced capability UE because the network device considers by default that the reduced capability UE supports 100 MHz. Consequently, the reduced capability UE may not normally work on the allocated resource. Therefore, the network device needs to be improved for the reduced capability UE, to enable the network device to support the reduced capability UE.

For ease of description, in embodiments of this application, a network device that does not support the NR Light is referred to as a "legacy/normal network device" or a "network device that does not support reduced capability UE". The legacy network device considers by default that all bandwidths supported by a terminal device are a bandwidth reported by the terminal device in a bitmap and 100 MHz. In embodiments of this application, a network device supporting the reduced capability UE is referred to as a "network device that supports reduced capability UE". It can be understood that the network device that supports the reduced capability UE may identify the reduced capability UE by using capability information reported by the terminal device, and learns an actual capability status of the terminal device. In other words, for the reduced capability UE, the network device that supports the reduced capability UE considers that a bandwidth of the reduced capability UE is a bandwidth reported by the reduced capability UE. A bandwidth reporting method may include reporting the bandwidth by using an original bitmap or reporting the bandwidth in another form. For the legacy UE, the network device that supports the reduced capability UE considers that a bandwidth of the legacy UE is a bandwidth reported by the legacy UE in a bitmap and 100 MHz. Alternatively, for the legacy UE, the network device that supports the reduced capability UE considers that a bandwidth of the legacy UE is a bandwidth reported by the legacy UE in a bitmap or in another form, and 100 M.

Figure 2:
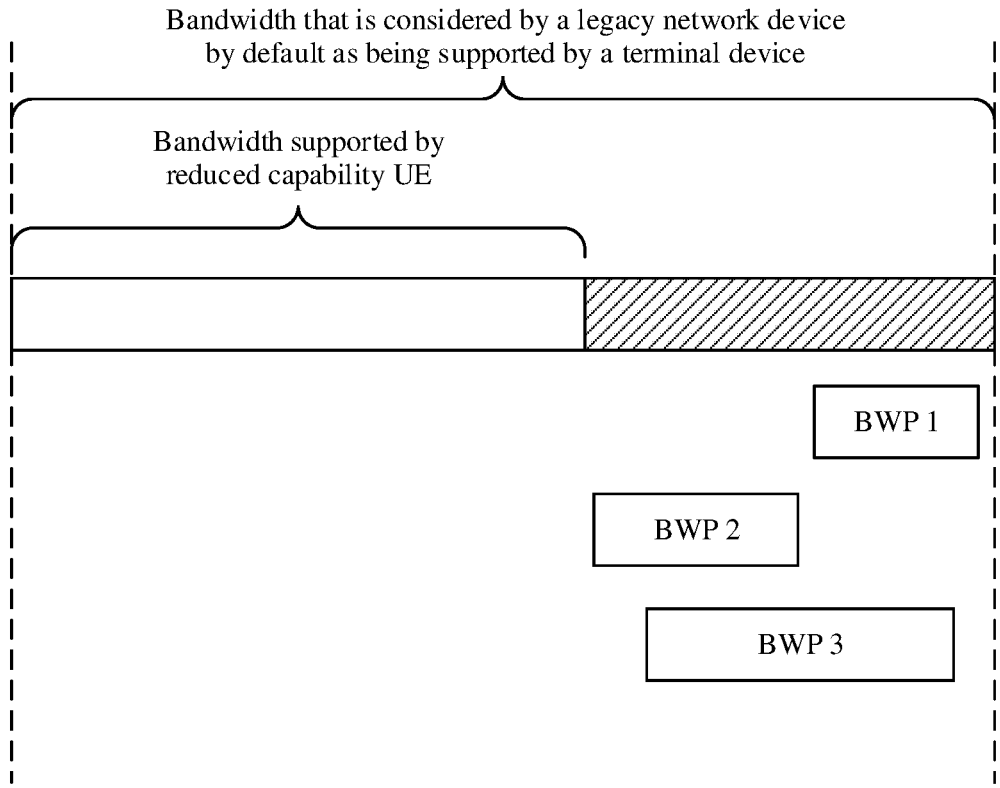
FIG. 2 is a schematic diagram of bandwidths that are supported by reduced capability UE and a legacy network device according to an embodiment of this application.

Based on the network architectures shown in FIG. 1A and FIG. 1B, in a plurality of service scenarios, based on implementation of a current protocol, the reduced capability UE may camp on the legacy network device, or the reduced capability UE may be handed over to the legacy network device. FIG. 2 is a schematic diagram of bandwidths that are supported by reduced capability UE and a legacy network device according to an embodiment of this application. As shown in FIG. 2, because the legacy network device considers by default that the reduced capability UE supports a bandwidth of 100 MHz, the legacy network device may allocate, to this type of terminal device, an uplink resource and a downlink resource that may not be supported by the reduced capability UE. If the reduced capability UE camps on the legacy network device, or is handed over to the legacy network device, the legacy network device considers by default that the reduced capability UE supports 100 MHz, and incorrectly determines a capability of the reduced capability UE. For example, the legacy network device may allocate, to the reduced capability UE, a bandwidth part (BWP) that cannot be used by the reduced capability UE. For example, a BWP 1, a BWP 2, and a BWP 3 shown in FIG. 2 are allocated to the reduced capability UE. As a result, the reduced capability UE cannot work normally.

Descriptions are separately provided below with reference to several possible service scenarios.

(1) Cell selection scenario. Based on the network architecture shown in FIG. 1A, when a terminal device enters coverage of a network device since the terminal device is powered on or from a blind area, the terminal device searches for a frequency allowed by a public land mobile network (PLMN), and selects a suitable cell to camp on. This process is referred to as cell selection. A purpose of cell selection is to enable the terminal device to camp on the cell as soon as possible, so that the terminal device can receive a system message broadcast by the PLMN, initiate a random access process in the cell, receive paging from a network side, and receive a cell broadcast service.

The cell selection procedure is as follows: After the terminal device is powered on, the terminal device first needs to select a suitable PLMN, and then performs cell selection based on the determined PLMN. The cell selection process includes four parts, namely, cell searching, system message receiving, cell selection, and cell camping. Registration can be performed in the PLMN only after a cell that satisfies a camping condition is selected in the PLMN. The terminal device achieves frequency and symbol synchronization (downlink synchronization) with the cell through cell searching, obtains a start position of a downlink frame, and determines a physical cell identifier (PCI) of the cell. After completing cell searching, the terminal device receives a system message of the cell. The terminal device obtains common information of a network access stratum and a non-access stratum by reading the system message, so that the terminal device knows a network configuration status before initiating a call, and initiates the call in an appropriate manner. The terminal device may read, from the system message, a part of capability information of a base station, for example, a bandwidth and an initial BWP that are supported by a target base station. Based on the foregoing information, the terminal device determines, with reference to a capability of the terminal device, whether the capability of the terminal device can support camping on the base station. Then, the terminal device selects, based on a measurement result, a cell that satisfies a criterion S for camping. The cell camping enables the terminal device to receive the system information broadcast by the PLMN, initiate the random access process in the cell, receive the paging from a network, and receive the cell broadcast service.

The criterion S is a criterion used to determine whether a cell satisfies a camping requirement. The criterion S may include: If a parameter of a cell satisfies Srxlev>0, the cell satisfies the camping requirement. Srxlev is a cell receive level value, and is referred to as a value S. A formula for calculating Srxlev is as follows:

$$Srxlev=Qrxlevmeas-(Qrxlevmin+Qrxlevminoffset)-Pcompensation$$

Qrxlevmeas is a reference signal received power of the cell obtained through measurement, Qrxlevmin is a minimum required reference signal received power of the cell, Qrxlevminoffset is an offset value relative to Qrxlevmin, and Pcompensation is a power compensation value.

It should be noted that the foregoing formula for calculating Srxlev is merely a possible example, and there may be another form. For example, the parameters in the foregoing formula may have different names, or the parameters may be added to or deleted from the foregoing formula.

It can be learned that, in the existing cell selection procedure, the terminal device cannot learn whether the network device supports the reduced capability UE. As a result, when performing cell selection according to the foregoing existing procedure, the reduced capability UE may choose to camp on the legacy network device. Consequently, the reduced capability UE cannot work normally.

(2) Handover scenario. Based on the network architecture shown in FIG. 1B, when a terminal device in a connected mode moves from coverage of the first network device to coverage of the second network device, to ensure communication continuity and quality of service of the terminal device, a communication system may transfer a communication link between the terminal device and an original cell (a cell of the first network device) to a new cell (a cell of the second network device). The foregoing process is referred to as handover. A handover process is controlled by a network device. The network device delivers related configuration information to the terminal device. The terminal device completes handover measurement based on the configuration information, and reports a measurement result to the network device based on a measurement reporting trigger condition. The handover process is completed under control of the network device, to ensure an uninterrupted communication service.

A handover procedure that is based on an Xn interface is as follows: A source network device (for example, the first network device) makes a handover decision based on a measurement result reported by a terminal device and another factor. The source network device selects a target network device (for example, the second network device), and sends a handover request message to the target network device. The target network device determines, based on the obtained information, whether handover is allowed. If the handover is allowed, the target network device returns a handover acknowledgment message to the source network device. If the handover is not allowed, the target network device returns a handover preparation failure message to the source network device.

A handover procedure that is based on an NG interface is similar to the handover procedure that is based on an Xn interface. A difference lies in that handover signaling between the source network device and the target network device needs to be forwarded by a core network device AMF.

In the existing handover procedure, when sending the handover request message to the target network device, the source network device does not determine whether the target network device supports the reduced capability UE, that is, does not determine whether the target network device is a legacy network device or a network device that supports the reduced capability UE. Therefore, when the terminal device that is to be handed over is the reduced capability UE, the source network device may hand over the reduced capability UE to the legacy network device according to the existing handover procedure, and consequently, the reduced capability UE cannot work normally.

(3) ANR scenario. To reduce a burden of a network administrator in manually managing a neighbor cell relation (neighbor cell relation, NCR), an automatic neighbor relation (automatic neighbor relation, ANR) function is introduced in Release 15 of the 3GPP protocol. For a cell for which the ANR function is configured, the network device indicates a terminal device in a serving cell of the network device to detect a new target cell, and read global and physical identifiers (that is, global and physical IDs, for example, an NR CGI/NR PCI and an ECGI/PCI) of the target cell. Neighbor cell information read by the terminal device is reported to the network device by using a cell global identifier procedure report (CGI procedure report), and the network device stores the neighbor cell information in a neighbor cell relation table (NCRT) of the serving cell. In this way, incorrect addition of a neighbor cell is avoided, where the incorrect addition affects decision of quality and stability of a system and is caused because a pilot leakage or the like may occur when the network device adds a neighbor cell relation.

With reference to the network architecture shown in FIG. 1B, it is assumed that the terminal device camps on a cell of the first network device, that is, the cell of the first network device is a serving cell of the terminal device. When detecting a cell of the second network device, the terminal device reports global and physical identifiers (that is, global and physical IDs, for example, an NR CGI/NR PCI and an ECGI/PCI) and the like of the detected cell to the first network device. In this way, the first network device may perform detection, creation, deletion, or the like of a neighbor cell relation based on the information reported by the terminal device. Further, in a subsequent handover procedure, the first network device may select a target network device based on the neighbor cell relation. In an ANR measurement reporting process, the terminal device reports a CGI procedure report corresponding to the PCI, where the CGI procedure report includes a CGI, a PLMN ID, tracking area code (TAC), and the like.

It can be learned that, in the existing ANR procedure, the CGI procedure report received by the first network device from the terminal device does not include information about whether a cell of another network device supports the reduced capability UE. In other words, the first network device cannot learn, based on the information in the CGI procedure report, whether the second network device is a legacy network device or a network device that supports reduced capability UE. Therefore, in a subsequent handover procedure, the first network device may hand over the reduced capability UE to the legacy network device, and consequently, the reduced capability UE cannot work normally.

To resolve at least one of the foregoing problems, an embodiment of this application provides a communication method, to prevent reduced capability UE from camping on a legacy network device, or prevent reduced capability UE from being handed over to a legacy network device.

The following describes the technical solutions of this application in detail with reference to the accompanying drawings by using several specific embodiments. The following specific embodiments may be mutually combined, and same or similar concepts or processes are not repeatedly described in some embodiments.

Figure 3:
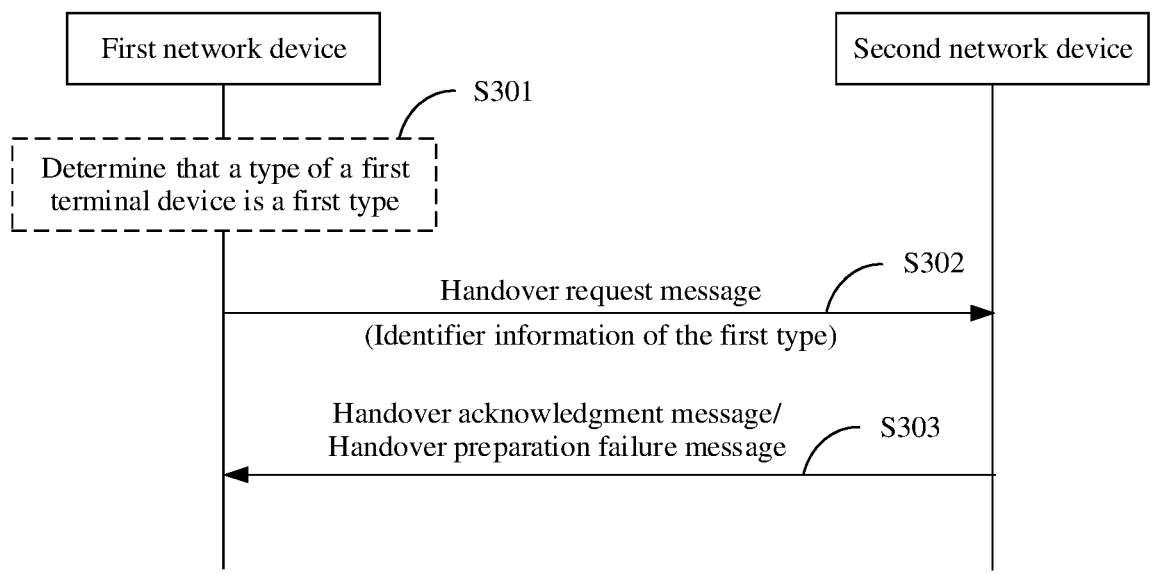
FIG. 3 is a schematic flowchart of a communication method according to an embodiment of this application.

FIG. 3 is a schematic flowchart of a communication method according to an embodiment of this application. The communication method in this embodiment may be applied to a handover scenario that is based on an Xn interface. As shown in FIG. 3, the method in this embodiment includes the following steps.

S301: A first network device determines that a type of a first terminal device is a first type.

In this embodiment, the first network device may also be referred to as a source network device, and a second network device may also be referred to as a target network device. The first terminal device is a terminal device that is to be handed over. In an application scenario of this embodiment, the first terminal device is in a connected mode, and a cell of the first network device is a current serving cell of the first terminal device. The first network device makes a handover decision based on a measurement report reported by the first terminal device and other information. In this embodiment, it is assumed that the first network device uses the second network device as the target network device, that is, the first network device attempts to hand over the first terminal device to a cell of the second network device.

This application relates to a plurality of types of terminal devices, and the first type is one of the plurality of types. It should be understood that there may be a plurality of manners for classifying the types of the terminal devices.

In an example, the plurality of types of the terminal devices may be classified based on capabilities of the terminal devices. A capability of the terminal device includes one or more of the following: a maximum transmission bandwidth, a transmission rate, reliability, delay tolerance, a quantity of antennas, standby time, or the like. Different types of terminal devices have different capabilities.

Optionally, the plurality of types of the terminal devices may include the first type and a second type. A capability of a terminal device of the first type is weaker than a capability of a terminal device of the second type. For example, the terminal device of the first type may be reduced capability UE, and the terminal device of the second type is a terminal device whose capability is stronger than that of the reduced capability UE. For example, the terminal device of the second type may be legacy UE. It can be learned from the foregoing descriptions that a capability of the legacy UE in terms of the maximum transmission bandwidth, the transmission rate, and the like is stronger than that of the reduced capability UE.

S302: The first network device sends a handover request message (HANDOVER REQUEST message) to the second network device, where the handover request message includes first indication information, and the first indication information includes identifier information of the first type.

S303: The second network device sends a handover acknowledgment message (HANDOVER REQUEST ACKNOWLEDGE message) or a handover preparation failure message (HANDOVER PREPARATION FAILURE message) to the first network device.

In an existing handover procedure, the first network device sends the handover request message (HANDOVER REQUEST message) to the second network device. The handover request message includes configuration information and progress information of a service that is being performed by the terminal device that is to be handed over. For example, the handover request message includes one or more of the following information: a progress of a current quality of service flow (QoS flow), an established protocol data unit (PDU) session, a configuration related to the PDU session, and a data radio bearer (DRB) associated with the PDU session, security capabilities (UE Security Capabilities IE) of the terminal device, and access stratum security information (AS Security Information). In this way, the second network device may determine, based on the information carried in the handover request message, whether to agree to the handover.

In an example, the handover request message may include capability information of the first terminal device. The capability information may include one or more of the following: a maximum transmission bandwidth, a transmission rate, reliability, delay tolerance, a quantity of antennas, standby time, or the like. In another example, the handover request message may include a capability identifier of the first terminal device or an identifier of a capability set. The capability identifier or the identifier of the capability set is used to indicate the capability information of the terminal device. In this way, based on the capability information of the first terminal device, the second network device may prepare a handover resource for the first terminal device, or determine whether to agree to the handover.

In this embodiment, the type of the first terminal device is the first type. To prevent the first terminal device from being handed over to a network device that does not support the first type, the handover request message (HANDOVER REQUEST message) sent by the first network device includes the first indication information. The first indication information includes the identifier information of the first type. The identifier information of the first type is any information that can be used to identify the first type. In an example, the identifier information of the first type may be a name of the first type. For example, when the terminal device of the first type is reduced capability UE, the identifier information of the first type may be the reduced capability UE. In another example, different types may correspond to different indexes. In this case, the identifier information of the first type may be an index corresponding to the first type. Optionally, the handover request message may include configuration information and progress information of a service that is being performed by the terminal device that is to be handed over, for example, one or more of a progress of a current quality of service flow (QoS Flow), a PDU session, a configuration related to the PDU session, and a data radio bearer (DRB) associated with the PDU session; and/or the handover request message may include an information field related to the terminal device, for example, a security capabilities (UE Security Capabilities) field or an access stratum security information (AS Security Information) field of the terminal device. The foregoing fields are used to activate security information for the terminal device in the target network device.

The handover request message carries the first indication information used to indicate the identifier information of the first type, so that when receiving the handover request message, the second network device can determine, based on the first indication information, that the type of the terminal device that is to be handed over is the first type. Further, the second network device may determine, depending on whether the second network device supports the terminal device of this type, whether to agree to the handover. For example, if the second network device does not support the terminal device of the first type, the second network device rejects the handover, and sends, to the first network device, the handover preparation failure message that carries a failure cause (failure cause value). If the second network device supports the terminal device of the first type, an existing handover procedure (for example, determining, based on other information in the handover request message, whether to agree to the handover) may continue to be performed, and the second network device sends the handover acknowledgment message to the first network device when the second network device finally determines to agree to the handover.

It should be noted that, in this embodiment of this application, "the second network device supports the terminal device of the first type" means that the second network device has a capability of providing a network service for the terminal device of the first type, and the second network device also allows the terminal device of the first type to access a cell of the second network device. "The second network device does not support the terminal device of the first type" may include the following two cases: (1) The second network device does not have the capability of providing a network service for the terminal device of the first type. For example, the second network device is a legacy network device. (2) The second network device has the capability of providing a network service for the terminal device of the first type. For example, the second network device is a "network device supporting reduced capability UE". However, due to factors such as a network deployment requirement and policy, and traffic control (traffic control), the second network device does not allow access of the terminal device of the first type.

In a possible implementation, if the second network device does not support the terminal device of the first type, the second network device sends a first handover preparation failure message to the first network device. In an example, the first handover preparation failure message includes failure information corresponding to the first type. For example, a failure cause (failure cause value) carried in the first handover preparation failure message indicates that the handover fails because the first type is not supported. In another example, the first handover preparation failure message includes a one-bit information field. Different states of the information field may indicate a failure cause. For example, when the information field is 1, it indicates that the handover fails because the first type is not supported. When the information field is 0, it indicates that the handover fails because of another cause.

In a possible implementation, the first indication information may further include key-value indication information. The key-value indication information is used to indicate that the second network device rejects the handover in a first condition. Optionally, the first condition may be that the second network device does not support the terminal device of the first type. In other words, if the second network device does not support or cannot identify the terminal device of the first type, the second network device rejects the handover, and sends the handover preparation failure message to the first network device. "The second network device does not support the terminal device of the first type" herein may include two cases. In a first case, the second network device can identify the identifier information of the first type, but the second network device does not support the terminal device of the first type. In a second case, the second network device cannot identify the identifier information of the first type.

It should be understood that, in this embodiment, the first indication information may carry the identifier information of the first type and the key-value indication information in a plurality of manners. The following uses a possible implementation as an example for description.

For example, a new IE or field (field) may be added to the handover request message (HANDOVER REQUEST message). For example, a name of the IE or field is reduced capability UE. The IE or field is used as the first indication information. The IE or field includes the identifier information of the first type and the key-value indication information. Optionally, for a definition manner of the IE or field, refer to a definition manner in the 3GPP RAN 3 protocol. An attribute corresponding to the IE or field is shown in Table 1. Refer to Table 1. The attribute of the IE or field may include: a name attribute, a presence form, and a key-value attribute. The name of the IE or field is the identifier information of the first type. The presence form of the IE or field is mandatory or optional. A key value of the IE or field may be "reject" or "ignore", namely, the key-value indication information, indicating whether the second network device performs a rejection behavior or an ignoring behavior when the second network device cannot identify the IE or field or the identifier information carried in the IE or field.

In addition, refer to Table 1. The IE or field may further include more other attributes, for example, a range attribute, a type attribute, and a criticality attribute. In Table 1, "XXXX" indicates a value of an attribute, and a value of another attribute is not limited in this embodiment. For example, the presence attribute (Presence) may be defined as "O" (Optional), indicating that the handover request message (HANDOVER REQUEST message) optionally includes the IE or field. The criticality attribute (Criticality) is defined as "Yes", indicating criticality of the IE or field.

For a handover scenario in this embodiment, assuming that the first terminal device that is currently to be handed over is reduced capability UE, when the first network device generates the handover request message (HANDOVER REQUEST message), the key value of the IE or field may be set to "reject". In this way, after the second network device receives the handover request message, if the second network device cannot identify the IE or field (for example, cannot identify the name of the IE or field, cannot identify an id name corresponding to the name of the IE or field, or cannot identify a type indicated by the IE or field, where in this case, it indicates that the second network device is a legacy network device), the second network device rejects a handover behavior, and sends handover failure information (HANDOVER PREPARATION FAILURE message) to the first network device. If the second network device can identify the IE or field (where in this case, it indicates that the second network device is a network device that supports reduced capability UE), the second network device may continue to perform the existing handover procedure, and send the handover acknowledgment message (HANDOVER REQUEST ACKNOWLEDGE message) to the first network device when the second network device finally determines to agree to the handover. Therefore, the first network device can be effectively prevented from handing over the reduced capability UE to the legacy network device.

TABLE 1

| IE name (IE/Group Name) | Presence (Presence) | Range (Range) | IE type (IE type and reference) | Semantics description (Semantics description) | Criticality (Criticality) | Key value (Assigned Criticality) |
|---|---|---|---|---|---|---|
| reduced capability UE | O | XXXX | XXXX | XXXX | YES | reject |

In this embodiment, the first network device is a network device that currently serves the first terminal device. In other words, the first network device supports the terminal device of the first type (reduced capability UE). The first network device may alternatively serve a second terminal device. The second terminal device is a terminal device of the second type (for example, legacy UE). In other words, the first network device may alternatively support the terminal device of the second type.

The communication method provided in this embodiment includes: The first network device determines that the type of the first terminal device is the first type, and the first network device sends the handover request message to the second network device. The handover request message includes the first indication information, and the first indication information includes the identifier information of the first type. In this way, after the second network device receives the handover request message, when the second network device does not support a terminal device of the first type, the second network device sends the handover preparation failure message to the first network device. When the second network device supports the terminal device of the first type, the existing handover procedure continues to be performed, and the second network device sends the handover acknowledgment message to the first network device when the second network device finally determines to agree to the handover. In the foregoing process, a terminal device of the first type can be prevented from being handed over to a network device that does not support the first type.

Figure 4:
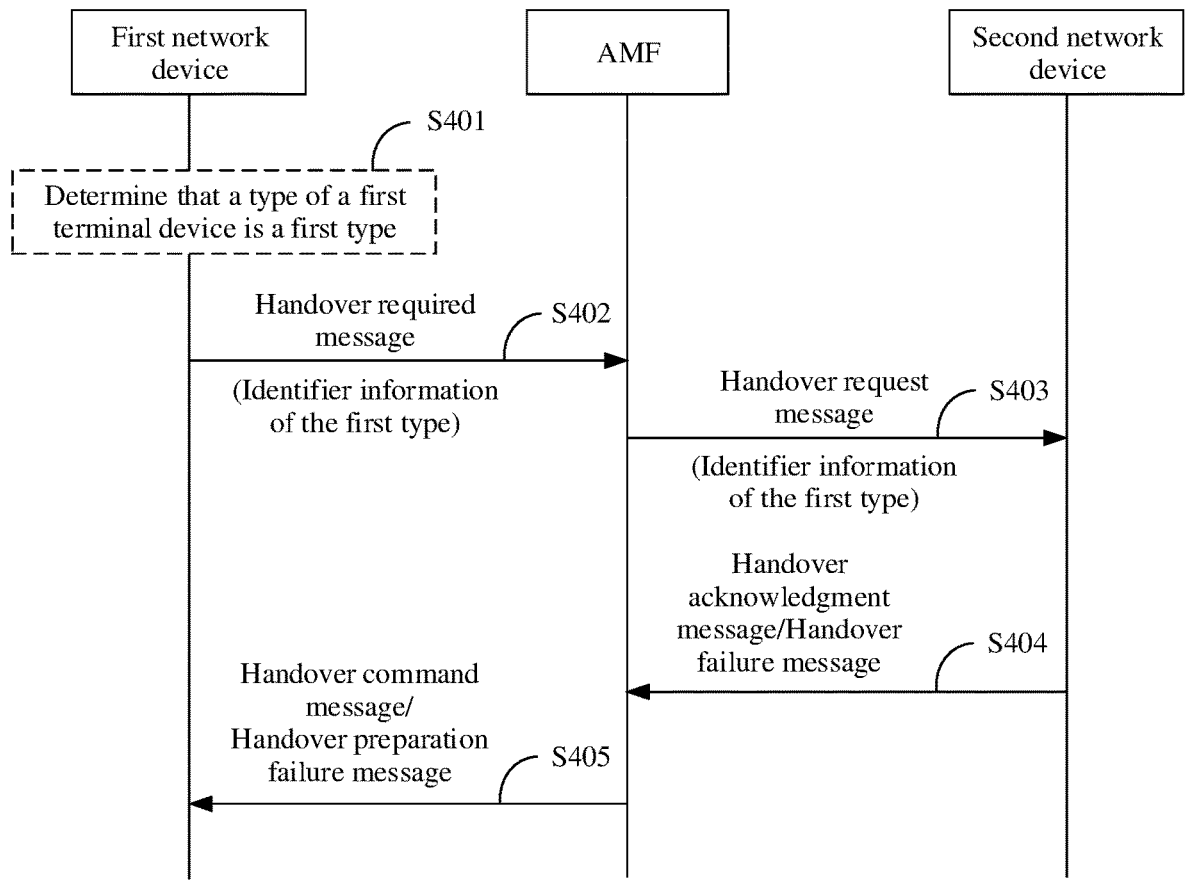
FIG. 4 is a schematic flowchart of a communication method according to an embodiment of this application.

FIG. 4 is a schematic flowchart of a communication method according to an embodiment of this application. The communication method in this embodiment may be applied to a handover scenario that is based on an NG interface. As shown in FIG. 4, the method in this embodiment includes the following steps.

S401: A first network device determines that a type of a first terminal device is a first type.

S402: The first network device sends a handover required message (HANDOVER REQUIRED message) to an AMF device, where the handover required message includes first indication information, and the first indication information includes identifier information of the first type.

S403: The AMF device sends a handover request message (HANDOVER REQUEST message) to a second network device, where the handover request message includes the first indication information.

S404: The second network device sends a handover acknowledgment message (HANDOVER REQUEST ACKNOWLEDGE message) or a handover failure message (HANDOVER FAILURE message) to the AMF device.

S405: The AMF device sends a handover command message (HANDOVER COMMAND message) or a handover preparation failure message (HANDOVER PREPARATION FAILURE message) to the first network device.

This embodiment is similar to the embodiment shown in FIG. 3. A difference lies in that this embodiment is applied to the handover scenario that is based on an NG interface, that is, handover signaling between the first network device and the second network device is forwarded by using the AMF device.

Description is performed below by using an example in which the first terminal device is reduced capability UE.

In this embodiment, to prevent the reduced capability UE from being handed over to a legacy network device, the new IE or field shown in Table 1 is added, as the first indication information, to fifth indication information that can be transparently transmitted to the AMF. The fifth indication information may be, for example, a Handover Required Transfer IE. The fifth indication information is included in the handover required message (HANDOVER REQUIRED message) sent by the first network device to the AMF. Because the fifth indication information is a transparent IE for the AMF, the AMF does not interpret the fifth indication information, but directly includes the fifth indication information in the handover request message (HANDOVER REQUEST message) and sends the handover request message to the second network device. The second network device interprets all content included in the fifth indication information. If the second network device can identify the first indication information (for example, can identify the new IE/field in Table 1, or can identify the identifier information carried in the new IE/field), it indicates that the second network device is a network device that supports reduced capability UE. The second network device continues to perform an existing protocol, and sends the handover acknowledgment message (HANDOVER REQUEST ACKNOWLEDGE message) to the AMF when the second network device finally determines to agree to the handover. If the second network device cannot identify the first indication information (for example, cannot identify the foregoing new IE/field in Table 1, or cannot identify the identifier information carried in the new IE/field), it indicates that the second network device is a legacy network device and does not support the reduced capability UE. The second network device rejects the handover behavior, and sends the handover failure message (HANDOVER FAILURE message) to the AMF. The handover failure message carries a failure cause (failure cause value).

If the AMF receives the handover acknowledgment message (HANDOVER REQUEST ACKNOWLEDGE message) from the second network device, the AMF sends the handover command message (HANDOVER COMMAND message) to the first network device, so that the first network device learns that the second network device has prepared a handover resource, and the handover may be performed. If the AMF receives the handover failure message (HANDOVER FAILURE message) from the second network device, the AMF sends the handover preparation failure message (HANDOVER PREPARATION FAILURE message) to the first network device, to notify the first network device that handover preparation has failed.

If the first network device receives the handover command message (HANDOVER PREPARATION FAILURE message) sent by the AMF, the first network device returns a handover notification message (HANDOVER NOTIFY message) to the AMF after the handover is completed, to notify the AMF that the terminal device has been identified by a cell of the second network device, and the handover is completed.

The communication method provided in this embodiment includes: The first network device determines that the type of the first terminal device is the first type, and the first network device sends the handover required message to the AMF. The handover required message includes the first indication information, the first indication information includes the identifier information of the first type, and the first indication information is included in the fifth indication information that can be transparently transmitted to the AMF. In this way, the AMF does not interpret the first indication information, but directly includes the first indication information in the handover request message, and sends the handover request message to the second network device. After the second network device receives the handover request message, when the second network device does not support the terminal device of the first type, the second network device sends the handover failure message to the AMF, where the handover failure message includes the failure cause (failure cause value). The AMF sends the handover preparation failure message to the first network device. The handover preparation failure message includes the failure cause (failure cause value), or indicates whether the handover fails because the first type is not supported. When the second network device supports the terminal device of the first type, an existing handover procedure continues to be performed, and the second network device sends the handover acknowledgment message to the AMF when the second network device finally determines to agree to the handover. The AMF sends the handover command message to the first network device. In the foregoing process, a terminal device of the first type (reduced capability UE) can be prevented from being handed over to a network device (a legacy network device) that does not support the first type.

Figure 5:
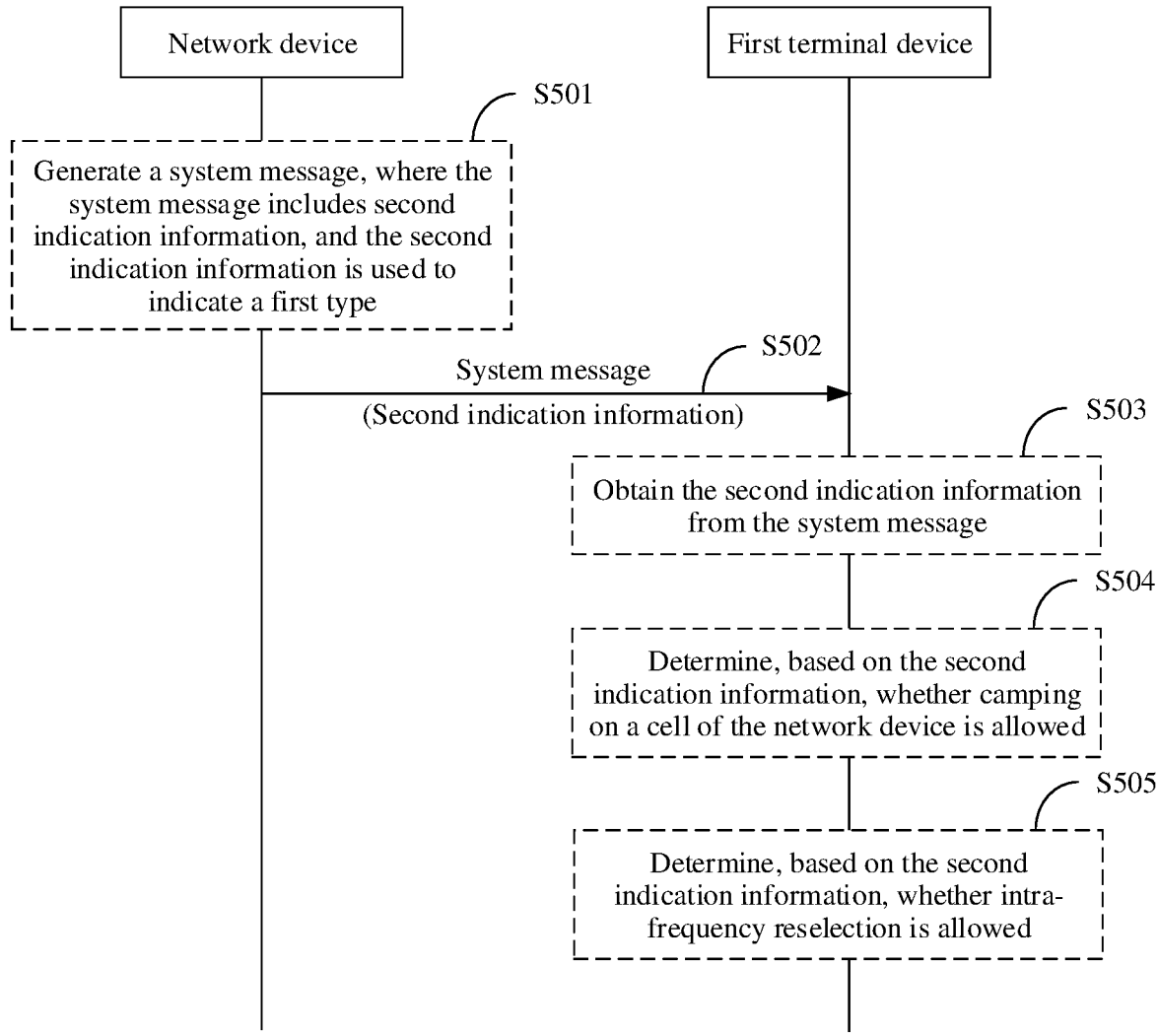
FIG. 5 is a schematic flowchart of a communication method according to an embodiment of this application.

FIG. 5 is a schematic flowchart of a communication method according to an embodiment of this application. The communication method in this embodiment may be applied to a cell selection scenario. As shown in FIG. 5, the method in this embodiment includes the following steps.

S501: A network device generates a system message, where the system message includes second indication information, the second indication information is used to indicate a first type, and the first type is one of a plurality of types of terminal devices.

S502: The network device sends the system message, and correspondingly, a first terminal device receives the system message.

A type of the first terminal device is the first type in S501. In other words, the first terminal device is a terminal device of the first type.

S503: The first terminal device obtains the second indication information from the system message.

S504: The first terminal device determines, based on the second indication information, whether the first terminal device is allowed to camp on a cell of the network device.

In an application scenario of this embodiment, the first terminal device is in an idle mode. For example, the first terminal device may currently perform cell selection or cell reselection.

In this scenario, after the first terminal device completes cell search, the first terminal device achieves downlink synchronization with the cell, and the first terminal device may receive the system message broadcast by the network device of the cell. The system message broadcast by the network device is cell-level information. The system message may include a master information block (MIB) and a system information block (SIB), such as an SIB1 or an SIB2. The MIB includes some parameters that are in a limited quantity and that are the most important and the most frequently sent, and the terminal device needs to use these parameters to obtain another system message. For example, the MIB may include a downlink system bandwidth, a PHICH configuration, and an SFN. Different SIBs may be used to transmit a series of parameters related to different functions. The SIB1 includes a parameter used to determine whether a cell is suitable for cell selection, the SIB2 includes common radio resource configuration information, and the like.

The network device in this embodiment may be a "network device that supports reduced capability UE", and the first terminal device may be reduced capability UE. It should be understood that, in this embodiment of this application, the "network device that supports reduced capability UE" is a network device that has a capability of providing a network service for the reduced capability UE. The "network device that supports reduced capability UE" does not necessarily allow the reduced capability UE to camp on. In an actual application, the "network device that supports reduced capability UE" may allow or not allow, based on factors such as a network deployment requirement and policy, and traffic control (traffic control), the reduced capability UE to camp on. The legacy network device does not have the capability of providing a network service for the reduced capability UE, and the legacy network device does not allow the reduced capability UE to camp on.

In this embodiment, the system message generated by the network device includes the second indication information, the second indication information is used to indicate the first type, and the first type is one of the plurality of types of terminal devices. For example, a terminal device of the first type may be the reduced capability UE.

Optionally, the system information may be the SIB1. In other words, the second indication information in this embodiment may be included in the SIB1.

The second indication information may be used to indicate a status of whether the cell of the network device allows the terminal device of the first type to camp on. Description is performed below with reference to the following two possible implementations.

In a first manner, the second indication information is used to indicate that the cell of the network device allows the terminal device of the first type to camp on. In this manner, whether the cell of the network device allows the terminal device of the first type to camp on is indicated by whether the system message has/includes the second indication information. When the system message generated by the network device has/includes the second indication information, it indicates that the cell of the network device allows the terminal device of the first type to camp on. When the system message generated by the network device does not have/include the second indication information, it indicates that the cell of the network device does not allow the terminal device of the first type to camp on. The second indication information may be a field or an indication field. When the system message has the field or the indication field, it indicates that the network device allows the terminal device of the first type to camp on.

In this manner, only a system message generated by a network device that allows the terminal device of the first type to camp on (it should be understood that the network device is definitely a network device that supports reduced capability UE) has/includes the second indication information. In other words, the network device that supports the reduced capability UE may allow the terminal device of the first type to camp on, or may not allow the terminal device of the first type to camp on. Whether the terminal device of the first type is allowed to camp is reflected by whether the system message generated by the network device has the second indication information. A system message generated by a network device that does not allow the terminal device of the first type to camp on does not have/include the second indication information. It should be understood that, that the network device does not allow the terminal device of the first type to camp on includes two cases. In one case, the network device is a network device that supports the reduced capability UE, but due to some factors, such as a network deployment requirement and policy, and traffic control (traffic control), the network device does not allow the terminal device of the first type to camp on. In the other case, the network device is a legacy network device, and does not have the capability of providing a network service for the terminal device of the first type.

Based on this manner, after receiving the system message, the first terminal device obtains the second indication information from the system message. "Obtain" herein is an action of obtaining the second indication information by the first terminal device. A result of obtaining includes the following two cases: The second indication information is obtained, and the second indication information fails to be obtained.

The first terminal device determines, depending on whether the second indication information is obtained from the system message (in other words, depending on whether the system message has/includes the second indication information), whether the first terminal device is allowed to camp on the cell of the network device. If the first terminal device obtains the second indication information from the system message (in other words, if the system message has/includes the second indication information), the first terminal device determines that the first terminal device is allowed to camp on the cell of the network device. If the first terminal device fails to obtain the second indication information from the system message (in other words, if the system message does not have/include the second indication information), the first terminal device determines that the first terminal device is not allowed to camp on the cell of the network device.

In an example, a new IE or field may be added to the system message, and the new IE or field is used as the second indication information. For a network device that supports the reduced capability UE, if the network device allows the terminal device of the first type to camp on, a system message generated by the network device has/includes the new IE or field. If the network device does not allow the terminal device of the first type to camp on, the system message generated by the network device does not have/include the new IE or field. The legacy network device does not support the new IE or field, and a system message generated by the legacy network device does not have/include the new IE or field.

In this way, after receiving the system message, the first terminal device obtains the IE or field from the system message. If the first terminal device obtains the IE or field from the system message (in other words, if the system message has/includes the IE or field), the first terminal device determines that the first terminal device is allowed to camp on the cell of the network device. If the first terminal device fails to obtain the IE or field from the system message (in other words, if the system message does not have/include the IE or field), the first terminal device determines that the terminal device of the first type is not allowed to camp on the cell of the network device.

In a second manner, the second indication information is used to indicate whether the cell of the network device allows the terminal device of the first type to camp on. In this manner, when the system message generated by the network device has/includes the second indication information, and a value of the second indication information is a first preset value, it indicates that the cell of the network device allows the terminal device of the first type to camp on. When the system message generated by the network device has/includes the second indication information, and the value of the second indication information is a second preset value, it indicates that the cell of the network device does not allow the terminal device of the first type to camp on. When the system message generated by the network device does not have/include the second indication information, it indicates that the cell of the network device does not allow the terminal device of the first type to camp on.

In this manner, a system message generated by the "network device that supports reduced capability UE" has/includes the second indication information, and the value of the second indication information is used to indicate whether the terminal device of the first type is allowed to camp on. For the legacy network device, that is, a network device that does not have the capability of providing a network service for the reduced capability UE, a system message generated by the legacy network device does not have/include the second indication information.

Because the system message generated by the "network device that supports reduced capability UE" has/includes the second indication information, but the system message generated by the legacy network device does not have/include the second indication information, the first terminal device may determine, depending on whether the system message has/includes the second indication information, whether a network device is the "network device that supports reduced capability UE" or the legacy network device.

Based on this manner, after receiving the system message, the first terminal device obtains the second indication information from the system message. "Obtain" herein is an action of obtaining the second indication information by the terminal device. A result of obtaining includes the following two cases: The second indication information is obtained, and the second indication information fails to be obtained. It should be understood that the second indication information may be obtained from the system message received from the "network device that supports reduced capability UE", and the second indication information cannot be obtained from the system message received from the legacy network device.

When the first terminal device obtains the second indication information from the system message (in other words, the system message has/includes the second indication information), it indicates that the network device is the "network device that supports reduced capability UE". In this case, the first terminal device determines, based on the obtained second indication information, whether the first terminal device is allowed to camp on the cell of the network device. If the second indication information indicates that the cell of the network device allows the terminal device of the first type to camp on, the first terminal device determines that the first terminal device is allowed to camp on the cell of the network device. If the second indication information indicates that the cell of the network device does not allow the terminal device of the first type to camp on, the first terminal device determines that the first terminal device is not allowed to camp on the cell of the network device.

When the first terminal device fails to obtain the second indication information from the system message (in other words, the system message does not have/include the second indication information), it indicates that the network device is the legacy network device. In this case, the first terminal device determines that the first terminal device is not allowed to camp on the cell of the network device.

In an example, a new IE or field may be added to the system message, and the IE or field is used as the second indication information. An attribute of the IE or field may be an enumeration (ENUMERATED {XXX}) type, for example, may enumerate {true/false}, {supported/notSupported}, or {1/0}. Certainly, enumeration may alternatively not be used. This is not specifically limited in this embodiment. For example, assuming that the name of the IE or field is ReducedCapabilityUE-Support, an added ASN.1 is as follows:

ReducedCapabilityUE-Support ENUMERATED
{true} OPTIONAL

The system message generated by the "network device that supports reduced capability UE" has/includes the IE or field. In addition, if the network device allows the terminal device of the first type to camp on, a value of the IE or field is true, supported, or 1. If the network device does not allow the terminal device of the first type to camp on, the value of the IE or field is false, notSupported, or 0. For the legacy network device, the system message generated by the legacy network device does not have/include the new IE or field.

In this way, after receiving the system message, the first terminal device obtains the IE or field from the system message. When the first terminal device obtains the IE or field from the system message (in other words, the system message has/includes the IE or field), and the value of the IE or field is true, supported, or 1, the first terminal device determines that the first terminal device is allowed to camp on the cell of the network device. When the first terminal device obtains the IE or field from the system message (in other words, the system message has/includes the IE or field), and the value of the IE or field is false, notSupported, or 0, the first terminal device determines that the first terminal device is not allowed to camp on the cell of the network device. When the first terminal device fails to obtain the IE or field from the system message (in other words, the system message does not have/include the IE or field), the first terminal device determines that the first terminal device is not allowed to camp on the cell of the network device.

In another example, a new IE or field may be alternatively added to the system message. The IE or field is used to list a type or types of one or more terminal devices allowed by the network device to camp on. It is assumed that a name of the IE or field is UEType-Supported, and a value of the IE or field may be {0, 1, 2}. 0 corresponds to the first type, 1 corresponds to the second type, and 2 corresponds to a third type. The IE or field indicates that terminal devices of the first type, the second type, and the third type are allowed to camp on.

In this way, after receiving the system message, the first terminal device obtains the IE or field from the system message. When the first terminal device obtains the IE or field from the system message (in other words, the system message has/includes the IE or field), and a type listed by the IE or field includes the first type, the first terminal device determines that the first terminal device is allowed to camp on the cell of the network device. When the first terminal device obtains the IE or field from the system message (in other words, the system message has/includes the IE or field), and the type listed by the IE or field does not include the first type, the first terminal device determines that the first terminal device is not allowed to camp on the cell of the network device. When the first terminal device fails to obtain the IE or field from the system message (in other words, the system message does not have/include the IE or field), the first terminal device determines that the first terminal device is not allowed to camp on the cell of the network device.

In still another example, a bitmap may be alternatively added to the system message, and the bitmap is used to indicate a type of a terminal device that is allowed or not allowed by the network device to camp on. For example, the type of the terminal device includes the first type and the second type. A bitmap including two bits may be used, where the two bits separately correspond to whether the cell of the network device allows the terminal device of the first type to camp on and whether the cell of the network device allows the terminal device of the second type to camp on. Alternatively, for example, the type of the terminal device includes the first type and the second type. An IE or field including one bit may be used to indicate whether the cell of the network device allows the terminal device of the first type to camp on. For example, if the terminal device of the first type is allowed to camp on, the bit is 1. If the terminal device of the first type is not allowed to camp on, the bit is 0.

In this way, after receiving the system message, the first terminal device obtains the IE or field from the system message. When the first terminal device obtains the IE or field from the system message (in other words, the system message has/includes the IE or field), and the bit corresponding to the first type in the IE or field is 1, the first terminal device determines that the first terminal device is allowed to camp on the cell of the network device. When the first terminal device obtains the IE or field from the system message (in other words, the system message has/includes the IE or field), and the bit corresponding to the first type in the IE or field is 0, the first terminal device determines that the first terminal device is not allowed to camp on the cell of the network device. When the first terminal device fails to obtain the IE or field from the system message (in other words, the system message does not have/include the IE or field), the first terminal device determines that the first terminal device is not allowed to camp on the cell of the network device.

In the foregoing examples, if the first terminal device determines that the first terminal device is allowed to camp on the cell of the network device, the first terminal device may continue to determine, according to the existing procedure, whether another cell camping condition is satisfied, and determine, when all other conditions are satisfied, to camp on the cell of the network device.

Optionally, in addition to the second indication information, the system message may further include frequency band information and bandwidth information that are supported by the network device, for example, one or more of an uplink frequency band list (frequencyBandList), a downlink frequency band list (frequencyBandList), a carrier bandwidth (carrierBandwidth), configuration information of an initial uplink BWP (initial uplink BWP), or configuration information of an initial downlink BWP (initial downlink BWP).

In this way, the first terminal device may determine, depending on whether the second indication information is obtained from the system message, and the frequency band information and the bandwidth information, whether the first terminal device is allowed to camp on the cell of the network device. Alternatively, the first terminal device determines, based on the second indication information obtained from the system message, and the frequency band information and the bandwidth information, whether the first terminal device is allowed to camp on the cell of the network device.

For example, based on the foregoing examples, if the first terminal device determines, depending on whether the second indication information is obtained, or based on the obtained second indication information, that the first terminal device is allowed to camp on the cell of the network device, the first terminal device may continue to determine whether the first terminal device supports the frequency band information, the bandwidth information, and the like, and determine, based on the criterion S, whether the first terminal device is allowed to camp on the cell of the network device. Based on the foregoing examples, if it is determined that the first terminal device is not allowed to camp on the cell of the network device, the first terminal device may consider the cell as a barred cell, that is, the first terminal device is forbidden to camp on the cell.

It may be understood that, in the foregoing two manners, when the system message has/includes the second indication information, it indicates that the network device is the "network device that supports reduced capability UE". In other words, the first terminal device may determine, based on that the system message has/includes the second indication information, that the network device is the "network device that supports reduced capability UE".

Optionally, based on the foregoing two manners, when the first terminal device determines that the network device is the "network device that supports reduced capability UE", the second indication information may be further used to indicate whether the cell of the network device allows the terminal device of the first type to perform intra-frequency reselection. Optionally, the method in this embodiment may further include the following step.

S505: The first terminal device determines, based on the second indication information, whether intra-frequency reselection is allowed.

Description is performed below with reference to the following three possible implementations.

In a first manner, the network device may indicate, by using that the system message has/includes the second indication information, that the cell of the network device allows the terminal device of the first type to perform intra-frequency reselection.

This manner may be used in combination with the foregoing second manner of indicating whether camping is allowed. In other words, when the network device indicates, by using the value of the second indication information, whether the cell of the network device allows the terminal device of the first type to camp on (that is, the value of the second indication information is the first preset value, indicating that the cell of the network device allows the terminal device of the first type to camp on, or the value of the second indication information is the second preset value, indicating that the cell of the network device does not allow the terminal device of the first type to camp on), the network device indicates, by using that the system message has/ includes the second indication information, that the cell of the network device allows the terminal device of the first type to perform intra-frequency reselection.

In this manner, the first terminal device determines, based on that the system message has/includes the second indication information, that the first terminal device is allowed to perform intra-frequency reselection. In other words, the first terminal device determines, based on that the second indication information is obtained from the system message, that the first terminal device is allowed to perform intra-frequency reselection.

The first terminal device determines, based on that the system message does not have/include the second indication information, that the first terminal device is not allowed to perform intra-frequency reselection. In other words, the first terminal device determines, based on that the second indication information fails to be obtained from the system message, that the first terminal device is not allowed to perform intra-frequency reselection.

In a second manner, the network device may indicate, by using the value of the second indication information, whether the cell of the network device allows the terminal device of the first type to perform intra-frequency reselection. For example, when the value of the second indication information is the first preset value, it indicates that the cell of the network device allows the terminal device of the first type to perform intra-frequency reselection. When the value of the second indication information is the second preset value, it indicates that the cell of the network device does not allow the terminal device of the first type to perform intra-frequency reselection.

This manner may be used in combination with the foregoing first manner of indicating whether camping is allowed. In other words, when the network device indicates, by using that the system message has/includes the second indication information, that the network device allows the terminal device of the first type to camp on, the network device indicates, by using the value of the second indication information, whether the cell of the network device allows the terminal device of the first type to perform intra-frequency reselection.

In this manner, when the first terminal device obtains the second indication information from the system message, if the second indication information indicates that the cell of the network device allows the terminal device of the first type to perform intra-frequency reselection (for example, the value of the second indication information is the first preset value), the first terminal device determines that the cell of the network device allows the first terminal device to perform intra-frequency reselection. If the second indication information indicates that the cell of the network device does not allow the terminal device of the first type to perform intra-frequency reselection (for example, the value of the second indication information is the second preset value), the first terminal device determines that the cell of the network device does not allow the first terminal device to perform intra-frequency reselection.

In an example, the value of the second indication information may enumerate {true/false}, {supported/notSupported}, {1/0}, or {allowed/notAllowed}. Certainly, enumeration may alternatively not be used. If the value that is of the second indication information and that is obtained by the first terminal device is true, supported, 1, or allowed, the first terminal device determines that the cell of the network device allows the first terminal device to perform intra-frequency reselection. If the value that is of the second indication information and that is obtained by the first terminal device is false, notSupported, 0, or notAllowed, the first terminal device determines that the cell of the network device does not allow the first terminal device to perform intra-frequency reselection.

In another example, a type or types of one or more terminal devices allowed by the network device to perform intra-frequency reselection is/are listed in the second indication information. For example, the value of the second indication information is {0, 1, 2}, where 0 corresponds to the first type, 1 corresponds to the second type, and 2 corresponds to the third type. This indicates that the network device allows the terminal devices of the first type, the second type, and the third type to perform intra-frequency reselection.

In this way, after the first terminal device obtains the second indication information from the system message, if a type listed in the second indication information includes the first type, the first terminal device determines that the cell of the network device allows the first terminal device to perform intra-frequency reselection. If the type listed in the second indication information does not include the first type, the first terminal device determines that the cell of the network device does not allow the first terminal device to perform intra-frequency reselection.

In still another example, a bitmap (bitmap) is used in the second indication information to indicate a type of a terminal device that is allowed or not allowed by the network device to perform intra-frequency reselection. For example, the type of the terminal device includes the first type and the second type. A bitmap including two bits may be used, where the two bits separately correspond to whether the cell of the network device allows the terminal device of the first type to perform intra-frequency reselection and whether the cell of the network device allows the terminal device of the second type to perform intra-frequency reselection. Alternatively, for example, the type of the terminal device includes the first type and the second type. One bit may be used to indicate whether the cell of the network device allows the terminal device of the first type to perform intra-frequency reselection. For example, if the terminal device of the first type is allowed to perform intra-frequency reselection, the bit is 1. If the terminal device of the first type is not allowed to perform intra-frequency reselection, the bit is 0.

In this way, after the first terminal device obtains the second indication information from the system message, if the bit corresponding to the first type in the second indication information is 1, the first terminal device determines that the cell of the network device allows the first terminal device to perform intra-frequency reselection. If the bit corresponding to the first type in the second indication information is 0, the first terminal device determines that the cell of the network device does not allow the first terminal device to perform intra-frequency reselection.

In a third manner, the second indication information and sixth indication information may be used to indicate whether the cell of the network device allows the terminal device of the first type to perform intra-frequency reselection. The sixth indication information may be indication information used to indicate whether the cell of the network device allows a terminal device (where the terminal device herein may be legacy UE) to perform intra-frequency reselection.

This manner may be used in combination with the foregoing first manner of indicating whether camping is allowed. In other words, the network device indicates, by using that the system message has/includes the second indication information, that the network device allows the terminal device of the first type to camp on. In addition, the network device indicates, by using the second indication information and the sixth indication information, whether the cell of the network device allows the terminal device of the first type to perform intra-frequency reselection.

This manner may further be used in combination with the foregoing second manner of indicating whether camping is allowed. In other words, the network device indicates, by using the value of the second indication information, whether the cell of the network device allows the terminal device of the first type to camp on (that is, the value of the second indication information is the first preset value, indicating that the cell of the network device allows the terminal device of the first type to camp on, or the value of the second indication information is the second preset value, indicating that the cell of the network device does not allow the terminal device of the first type to camp on). In addition, the network device indicates, by using the second indication information and the sixth indication information, whether the cell of the network device allows the terminal device of the first type to perform intra-frequency reselection.

Specifically, when the system message has/includes the second indication information, in other words, the network device is the "network device that supports reduced capability UE", if the sixth indication information indicates that the cell of the network device allows a terminal device (where the terminal device herein may be legacy UE) to perform intra-frequency reselection, it indicates that the cell of the network device allows the terminal device of the first type to perform intra-frequency reselection. If the sixth indication information indicates that the cell of the network device does not allow a terminal device (where the terminal device herein may be legacy UE) to perform intra-frequency reselection, it indicates that the cell of the network device does not allow the terminal device of the first type to perform intra-frequency reselection. When the system message does not have/include the second indication information, in other words, the network device is the legacy network device, it indicates that the cell of the network device does not allow the terminal device of the first type to perform intra-frequency reselection. In this case, a value of the sixth indication information does not need to be considered.

In this manner, the first terminal device may further receive the sixth indication information from the network device. When the system message has/includes the second indication information (in other words, the first terminal device obtains the second indication information from the system message), the first terminal device determines, based on the sixth indication information, whether the cell of the network device allows the first terminal device to perform intra-frequency reselection.

Specifically, when the system message has/includes the second indication information (in other words, the first terminal device obtains the second indication information from the system message), that is, the network device is the "network device that supports reduced capability UE", and the sixth indication information indicates that the cell of the network device allows a terminal device (where the terminal device herein may be legacy UE) to perform intra-frequency reselection, the first terminal device determines that the cell of the network device allows the first terminal device to perform intra-frequency reselection. When the system message has/includes the second indication information (in other words, the first terminal device obtains the second indication information from the system message), and the sixth indication information indicates that the cell of the network device does not allow a terminal device (where the terminal device herein may be legacy UE) to perform intra-frequency reselection, the first terminal device determines that the cell of the network device does not allow the first terminal device to perform intra-frequency reselection.

When the system message does not have/include the second indication information (in other words, the first terminal device fails to obtain the second indication information from the system message), that is, the network device is the legacy network device, the first terminal device determines that the cell of the network device does not allow the first terminal device to perform intra-frequency reselection.

The sixth indication information and the second indication information may be included in a same system message, or may be included in different system messages.

Optionally, the sixth indication information may be an intraFreqReselection IE in the system message, or may be another IE used to indicate whether intra-frequency reselection is allowed. A value of intraFreqReselection IE may enumerate {allowed/notAllowed}. When the first terminal device obtains the second indication information from the system message (in other words, the system message has/includes the second indication information), it indicates that the network device is the "network device that supports reduced capability UE". In this case, if the value of the intraFreqReselection IE is allowed, the first terminal device determines that the cell of the network device allows the first terminal device to perform intra-frequency reselection. If the value of the intraFreqReselection IE is notAllowed, the first terminal device determines that the cell of the network device does not allow the first terminal device to perform intra-frequency reselection. When the first terminal device fails to obtain the second indication information from the system message (in other words, the system message does not have/include the second indication information), it indicates that the network device is the legacy network device. In this case, regardless of whether the value of the intraFreqReselection IE is allowed or notAllowed, the first terminal device determines that the cell of the network device does not allow the first terminal device to perform intra-frequency reselection.

In the foregoing examples, if the first terminal device determines that the cell of the network device allows the first terminal device to perform intra-frequency reselection, the first terminal device may continue to determine, according to the existing procedure, whether another intra-frequency reselection condition is satisfied, and determine, when all conditions are satisfied, to perform intra-frequency reselection.

The communication method provided in this embodiment includes: The network device generates and sends the system message. The system message includes the second indication information, and the second indication information is used to indicate that the cell of the network device allows the terminal device of the first type to camp on or whether the cell of the network device allows the terminal device of the first type to camp on. In this way, the terminal device may determine, based on the second indication information in the system message, whether the terminal device is allowed to camp on the cell of the network device. For the reduced capability UE, if it is determined, based on the received system message, that the network device does not allow the reduced capability UE to camp on, the reduced capability UE does not camp on the cell of the network device. Only when it is determined that the network device allows the reduced capability UE to camp on, the cell of the network device is used as a candidate object for cell selection. Therefore, the reduced capability UE can be prevented from camping on the legacy network device. Further, the second indication information is further used to indicate whether the cell of the network device allows the terminal device of the first type to perform intra-frequency reselection. In this way, the terminal device determines, based on the second indication information, whether intra-frequency reselection is allowed. If the network device is the "network device that supports reduced capability UE", for the reduced capability UE, if it is determined, based on the received system information, that the network device does not allow the reduced capability UE to perform intra-frequency reselection, the reduced capability UE does not perform intra-frequency reselection. Only when it is determined that the network device allows the reduced capability UE to perform intra-frequency reselection, the reduced capability UE considers the intra-frequency reselection. Therefore, the reduced capability UE can be prevented from reselecting the legacy network device.

Figure 6:
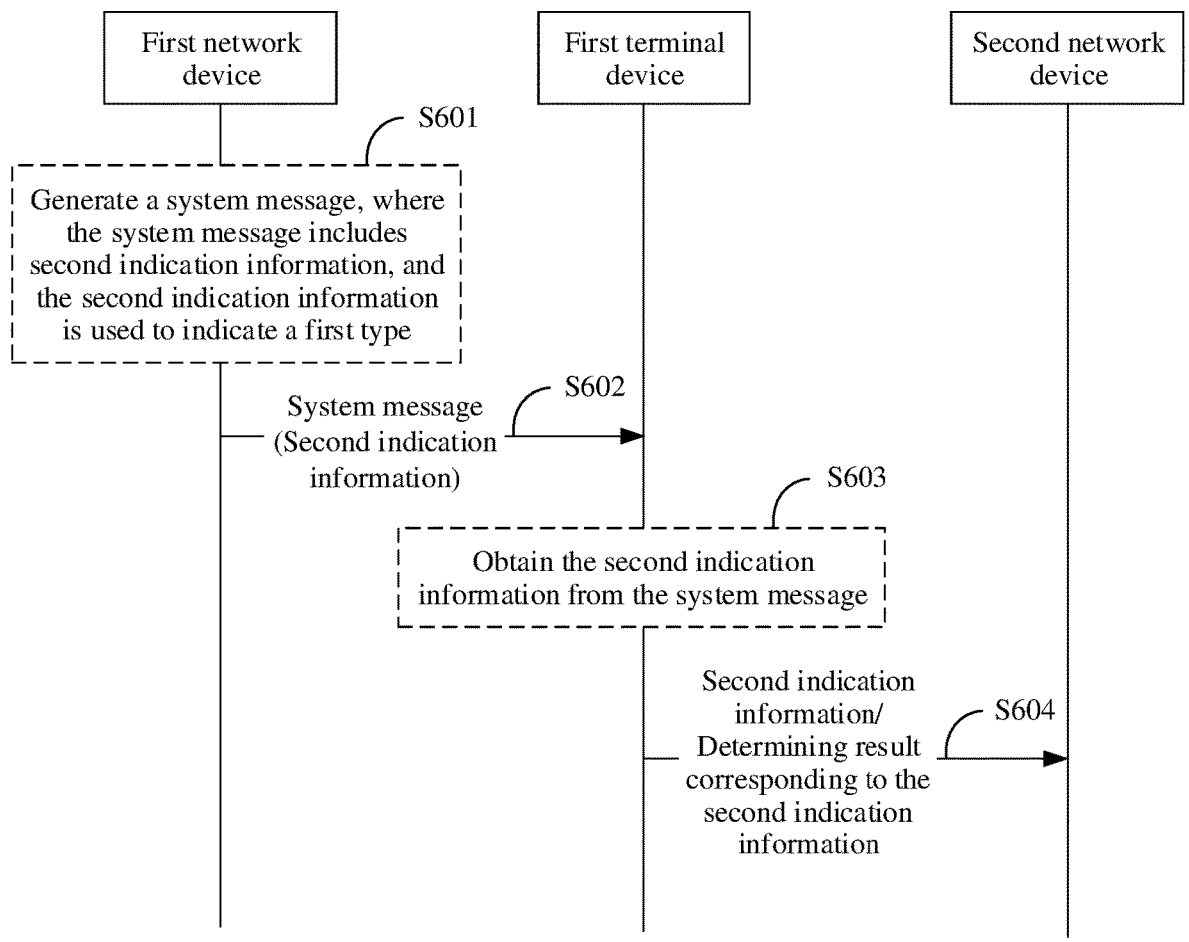
FIG. 6 is a schematic flowchart of a communication method according to an embodiment of this application.

FIG. 6 is a schematic flowchart of a communication method according to an embodiment of this application. As shown in FIG. 6, the method in this embodiment includes the following steps.

S601: A first network device generates a system message, where the system message includes second indication information, the second indication information is used to indicate a first type, and the first type is one of a plurality of types of terminal devices.

S602: The first network device sends the system message, and a first terminal device receives the system message.

Specific implementations of S601 and S602 in this embodiment are similar to those of S501 and S502 in FIG. 5, and details are not described herein again.

S603: The first terminal device obtains the second indication information from the system message.

An application scenario of this embodiment may be the foregoing ANR scenario. In this scenario, the first terminal device works in a cell of a second network device. In other words, the cell of the second network device is a serving cell of the first terminal device. The first network device is a network device corresponding to a neighbor cell of the serving cell of the terminal device. The first terminal device is in a connected mode.

When the first terminal device works in the cell of the second network device, the second network device may indicate the first terminal device to measure the neighbor cell. The first terminal device monitors broadcast of the neighbor cell, for example, monitors a system message (such as a MIB or an SIB1) broadcast by the first network device, and reads global and physical identifiers (that is, global and physical IDs, for example, an NR CGI/NR PCI and an ECGI/PCI) of the neighbor cell.

In this embodiment, the system message broadcast by the first network device may include the second indication information, and the second indication information is used to indicate the first type. The second indication information is used to indicate that a cell of the first network device allows a terminal device of the first type to camp on, or the second indication information is used to indicate whether the cell of the first network device allows the terminal device of the first type to camp on. For example, when the first type is reduced capability UE, the second indication information is used to indicate that the cell of the first network device allows the reduced capability UE to camp on, or indicate whether the cell of the first network device allows the reduced capability UE to camp on. In other words, in this embodiment, the second network device indicates the first terminal device to monitor the system message of the first network device, so that the second network device may obtain a status of whether the first network device allows the reduced capability UE to camp on.

Similar to the embodiment shown in FIG. 5, optionally, the system message in this embodiment may be an SIB1.

It should be understood that, in this embodiment, a manner of carrying the second indication information in the system message is similar to that in the embodiment shown in FIG. 5. Details are not described herein again.

S604: The first terminal device sends the second indication information or a determining result corresponding to the second indication information to the second network device, where the determining result is a result obtained by the first terminal device by determining, based on the second indication information, whether the first network device allows the terminal device of the first type to camp on.

In this embodiment, after obtaining the second indication information by parsing the system message broadcast by the first network device, the first terminal device may send the second indication information to the second network device. Therefore, the second network device learns whether the first network device allows the terminal device of the first type to camp on.

The first terminal device may send the second indication information to the second network device by using a plurality of implementations. This is not specifically limited in this embodiment. The following uses several possible implementations as examples for description.

In a possible implementation, after receiving the SIB1 from the first network device, the first terminal device sends, to the second network device, the second indication information obtained by parsing the SIB1. For example, the second indication information may be carried in a CGI procedure report (procedure report) or a measurement report (measurement report) for sending.

In another possible implementation, after receiving the SIB1 from the first network device, the first terminal device determines, based on the second indication information in the SIB1, whether the first network device allows the terminal device of the first type to camp on, and sends the determining result to the second network device. For example, an information field (field) may be added to the measurement report, the CGI procedure report, or another report. For example, if the determining result is that the first network device allows the terminal device of the first type to camp on, the newly added field may be set to 1, true, or supported. If the determining result is that the first network device does not allow the terminal device of the first type to camp on, the newly added field is set to 0, false, or notSupported.

After receiving the second indication information, the second network device may store the second indication information. For example, the second indication information may be stored in a neighbor cell relation table (neighbor cell relation table, NCRT).

Figure 7:
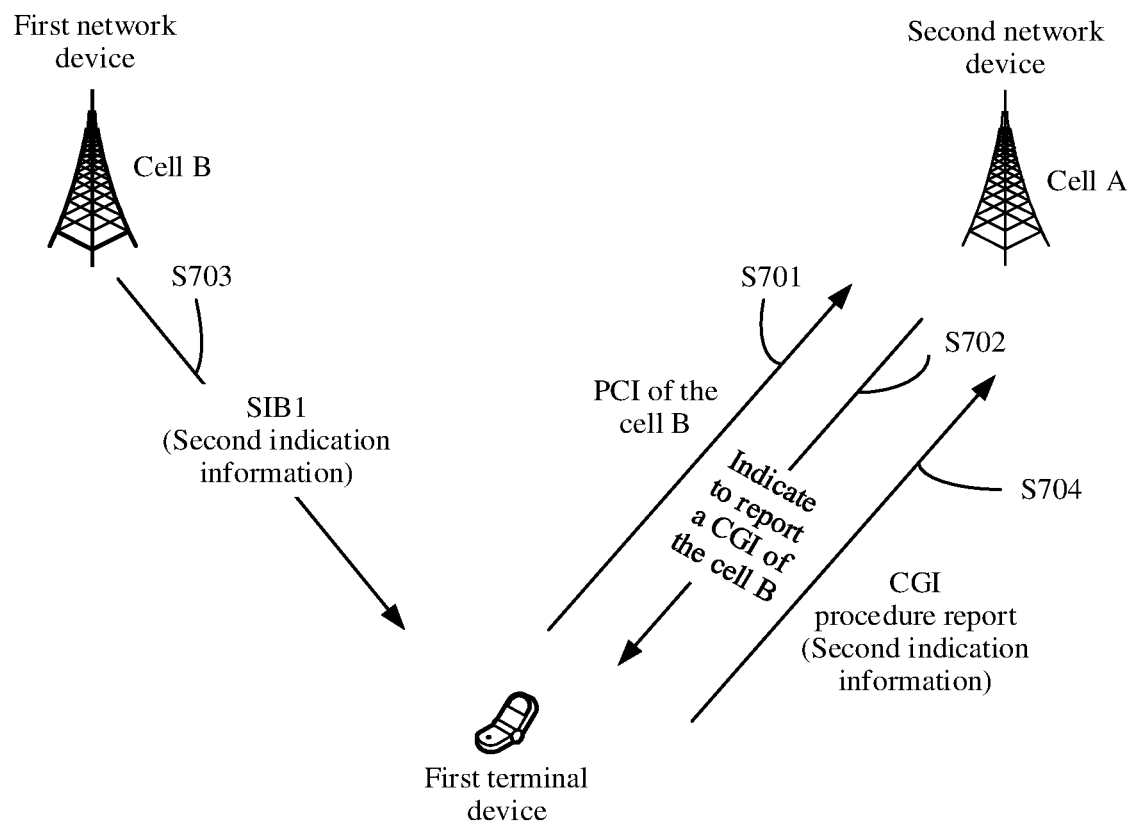
FIG. 7 is a schematic diagram of an exchange process in an ANR scenario according to an embodiment of this application.

The following describes a specific exchange process by using an example in which the second indication information is carried in the CGI procedure report for sending. FIG. 7 is a schematic diagram of an exchange process in an ANR scenario according to an embodiment of this application. As shown in FIG. 7, it is assumed that a first terminal device works in a cell A of a second network device. The first terminal device detects a cell B of a first network device. An ANR exchange process includes the following steps.

S701: The first terminal device sends a detected PCI of the cell B to the second network device.

S702: If the second network device discovers that the PCI that is reported by the first terminal device and that is of the cell B cannot be identified, the second network device indicates the first terminal device to obtain neighbor cell information corresponding to the PCI.

S703: The first terminal device receives an SIB1 of the cell B, and generates a CGI procedure report based on the neighbor cell information obtained by parsing the SIB1. The CGI procedure report includes one or more of a PLMN list, RAN area code (RAN area code, RANAC), tracking area code (tracking area code, TAC), a cell ID (Cell ID), a frequency band list, and second indication information.

S704: The first terminal device sends the CGI procedure report to the second network device.

In an existing ANR procedure, the first terminal device receives the SIB1 of the cell B, parses the SIB1 to obtain the PLMN list, the TAC, the cell ID, and the frequency band list that correspond to the cell B, carries the information in the CGI procedure report, and sends the CGI procedure report to the second network device. However, in this embodiment, when the SIB1 of the cell B includes the second indication information, the first terminal device may further carry, in the CGI procedure report or another report, the second indication information obtained by parsing the SIB1 of the cell B. In this way, after receiving the report from the UE, the second network device may learn, based on the second indication information carried in the report, whether the first network device allows a terminal device of a first type to camp on.

In this embodiment, the second indication information in the SIB1 is added to the CGI procedure report, so that there is no delay that is caused by measurement or reading of information related to another neighbor cell.

For differentiation, the CGI procedure report in the existing ANR procedure is referred to as an original (Original) CGI procedure report, and the CGI procedure report in this embodiment is referred to as an enhanced CGI procedure report. For example, content included in the enhanced CGI procedure report in this embodiment is shown in Table 2.

TABLE 2

| | Enhanced CGI Procedure Report | |
|---|---|---|
| | Information carried in an original CGI report | TAC, RANAC, PLMN ID, and NR frequency band |
| Enhanced CGI report procedure | Newly added information | Second indication information (for example, an IE/field used to indicate that the network device allows the terminal device of the first type to camp on, or indicate whether the network device allows the terminal device of the first type to camp on), or the determining |

TABLE 2-continued

Enhanced CGI Procedure Report

| Information carried in an original CGI report | TAC, RANAC, PLMN ID, and NR frequency band |
|---|---|
| | result that is obtained by the terminal device through determining based on the second indication information and that indicates whether the network device allows the terminal device of the first type to camp on. |

S705: The second network device initiates an Xn connection setup request to the first network device or the first network device initiates an Xn connection setup request to the second network device, to set up an Xn connection between the network devices, where the Xn connection is used for a subsequent handover procedure.

Alternatively, handover between the first network device and the second network device is performed by using an NG interface, that is, a handover request message and a handover success/failure message are forwarded by using an AMF in a core network. For example, when the Xn connection between the first network device and the second network device cannot be set up, the handover between the first network device and the second network device is performed by using the NG interface.

In this embodiment, when initiating handover, the second network device selects a target network device by using, as a determining condition, the information obtained from the CGI procedure report, including information indicating that another network device allows the terminal device of the first type (reduced capability UE) to camp on or information about whether another network device allows the terminal device of the first type to camp on. For example, if a type of a terminal device that is to be handed over is the reduced capability UE, the second network device selects, as the target network device, a network device (for example, the first network device) that allows the reduced capability UE to camp on. Therefore, the reduced capability UE may be prevented from being handed over to the legacy network device.

Figure 8:
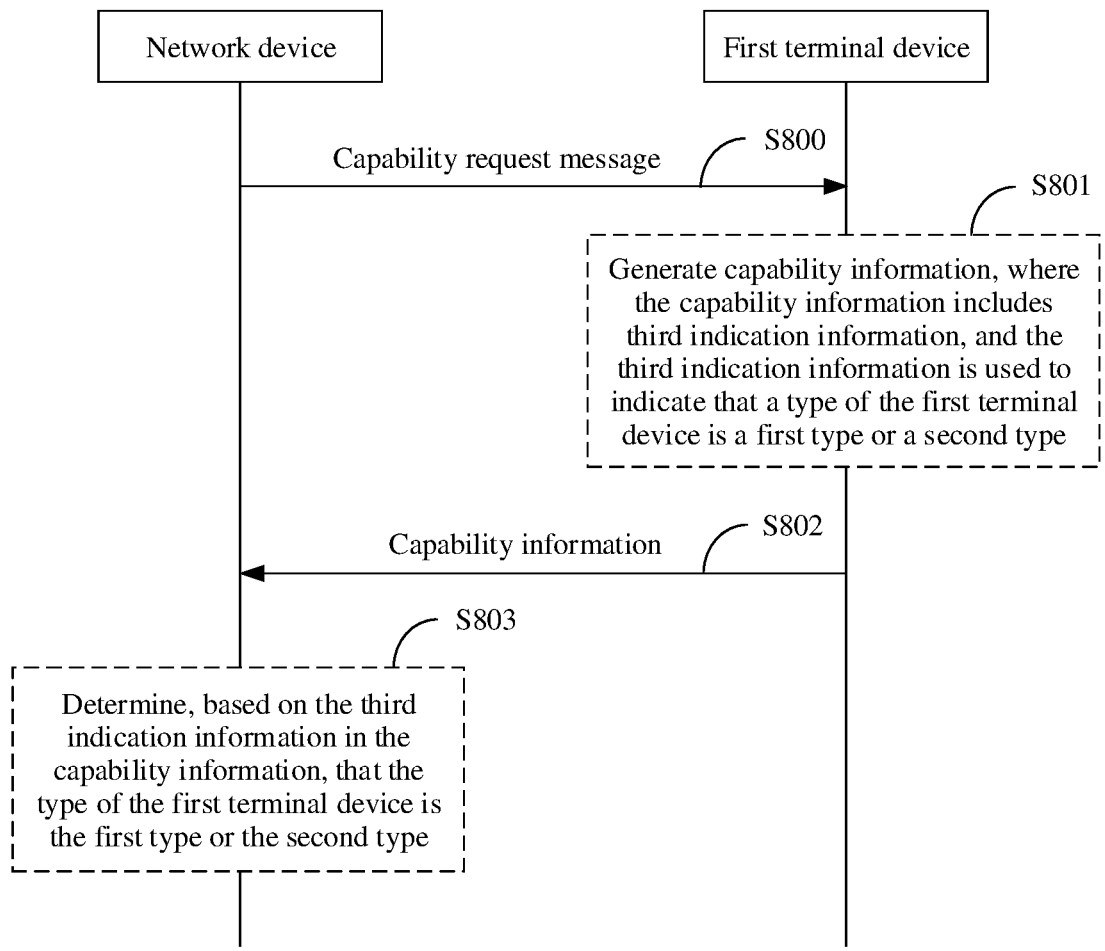
FIG. 8 is a schematic flowchart of a communication method according to an embodiment of this application.

FIG. 8 is a schematic flowchart of a communication method according to an embodiment of this application. As shown in FIG. 8, the method in this embodiment includes the following steps.

S801: A first terminal device generates capability information, where the capability information includes third indication information, the third indication information is used to indicate a type of a first terminal device, and the type of the first terminal device is a first type or a second type.

S802: The first terminal device sends the capability information to a network device.

Correspondingly, the network device receives the capability information from the first terminal device.

S803: The network device determines, based on the third indication information in the capability information, that the type of the first terminal device is the first type or the second type.

The method in this embodiment may be applied to a capability interaction scenario of a terminal device. The capability interaction scenario of the terminal device may include the following two scenarios.

Scenario 1: The terminal device actively reports the capability information of the terminal device to the network device. For example, when the terminal device attaches (attach) to a network, or the terminal device performs tracking area update (tracking area update, TAU), the terminal device actively reports the capability information.

Scenario 2: The network device queries the terminal device for the capability information of the terminal device. For the scenario 2, before S801, this embodiment may further include S800: The network device sends a capability request message to the first terminal device. Correspondingly, the first terminal device receives the capability request message from the network device. In other words, when the network device requires the terminal device to report the capability information, the network device delivers the capability request message (UECapabilityEnquiry) to the terminal device. After the terminal device receives the capability request message (UECapabilityEnquiry), the terminal device reports the UE capability information (UECapabilityInformation) based on the request message.

For example, a terminal device of the first type may be reduced capability UE. A terminal device of the second type may be a terminal device whose capability is stronger than that of the reduced capability UE. For example, the terminal device of the second type may be legacy UE.

In this embodiment, the first terminal device includes the third indication information in the capability information, to indicate the type of the first terminal device. In this way, the network device may determine the type of the first terminal device based on the received capability information. Therefore, the network device may use different processing manners based on the type of the first terminal device. For example, if the type of the first terminal device is the first type (reduced capability UE), it is considered that a bandwidth supported by the first terminal device is a bandwidth reported by the first terminal device by using a bitmap or in another form. When the first terminal device needs to be handed over, the first terminal device is handed over to a network device that supports the reduced capability UE. If the type of the first terminal device is the second type (for example, legacy UE), it is considered that the bandwidth of the first terminal device is a bandwidth sum 100 MHz that is reported by the first terminal device by using a bitmap or in another form.

Figure 9:
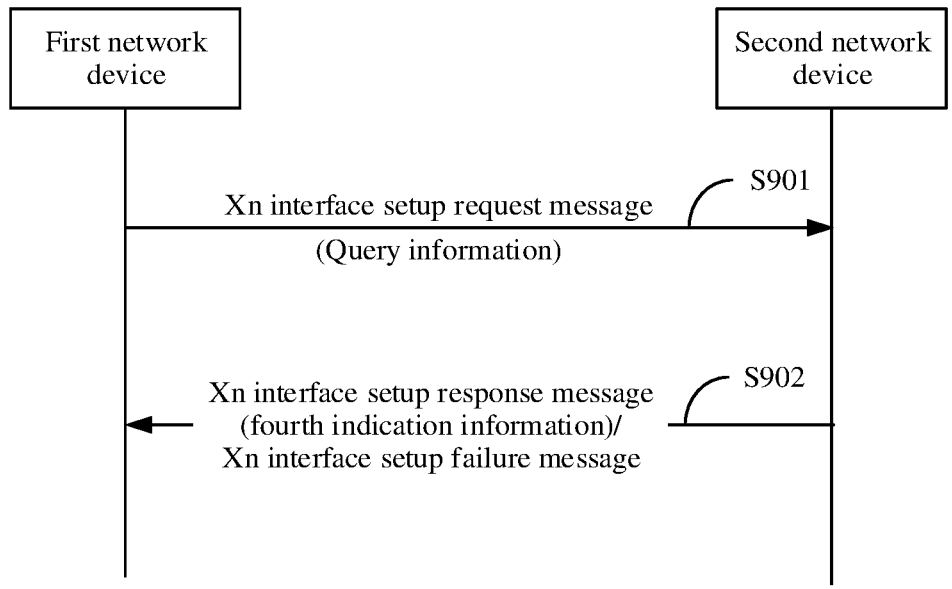
FIG. 9 is a schematic flowchart of a communication method according to an embodiment of this application.

FIG. 9 is a schematic flowchart of a communication method according to an embodiment of this application. The method in this embodiment may be applied to an Xn interface setup scenario. As shown in FIG. 9, the method in this embodiment includes the following steps.

S901: A first network device sends an Xn interface setup request message (XN SETUP REQUEST message) to a second network device, where the Xn interface setup request message includes query information, and the query information is used to query whether the second network device supports a terminal device of a first type.

In an example, assuming that the terminal device of the first type is reduced capability UE, a new IE or field (for example, reduced capability UE accessibility) may be added to the Xn interface setup request message (XN SETUP REQUEST message), to query whether the second network device supports the reduced capability UE.

The Xn interface setup request message may further include application data of the first network device. Application data of a network device includes but is not limited to an ID of the network device, AMF region information (AMF region information) corresponding to the network device, cell information and neighbor cell information of the network device, and the like. In this way, the second network device may determine, based on the application data of the first network device, whether to establish an Xn interface with the first network device.

S902: The second network device sends an Xn interface setup response message (XN SETUP RESPONSE message) or an Xn interface setup failure message (XN SETUP FAILURE message) to the first network device, where the Xn interface setup response message includes fourth indication information, and the fourth indication information is used to indicate whether the second network device supports the terminal device of the first type.

If the second network device determines that the Xn interface cannot be set up, the second network device sends the Xn interface setup failure message (XN SETUP FAILURE message) to the first network device.

If the second network device allows setup of the Xn interface, the second network device sends the Xn interface setup response message (XN SETUP RESPONSE message) to the first network device. In this embodiment, the Xn interface setup response message includes the fourth indication information. The fourth indication information may have a plurality of forms, and this is not limited in this embodiment. For example, one bit may be newly added to the Xn interface setup response message, or one existing bit may be reused to indicate the fourth indication information. If the second network device supports the terminal device of the first type, the bit is set to 1. If the second network device does not support the terminal device of the first type, the bit is set to 0. In this way, the first network device may learn, based on the fourth indication information, whether the second network device supports the terminal device of the first type.

Certainly, the Xn interface setup response message (XN SETUP RESPONSE message) may further include application data of the second network device. In this way, the first network device may learn related information of the second network device based on the application data of the second network device.

The first network device may further store the application data of the second network device and the fourth indication information. When the first network device needs to initiate handover to the terminal device of the first type, the first network device may determine, based on stored fourth indication information of each network device, a target network device to which the terminal device of the first type is to be handed over. For example, when the first network device needs to initiate handover to the reduced capability UE, the first network device may select, based on the stored fourth indication information of each network device, a network device that supports the reduced capability UE as the target network device. Therefore, the reduced capability UE is prevented from being handed over to a network device that does not support the reduced capability UE.

Figure 10:
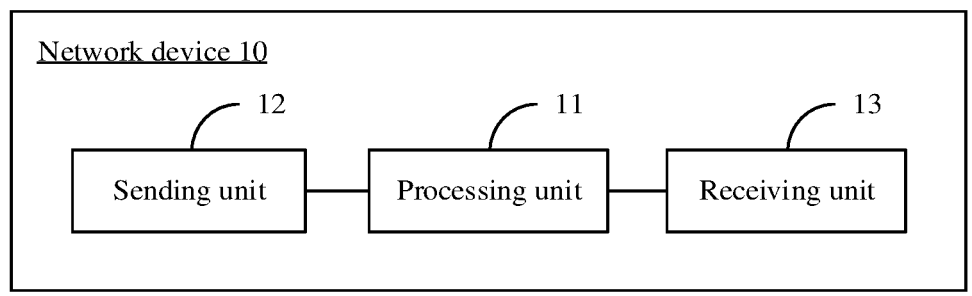
FIG. 10 is a schematic diagram of a structure of a network device according to an embodiment of this application.

An embodiment of this application provides a communication apparatus. The communication apparatus may be a network device or an element in the network device, for example, a chip or an integrated circuit. The following uses a network device as an example for description. A person skilled in the art may learn that the following network device may be replaced with a communication apparatus such as a chip or an integrated circuit. FIG. 10 is a schematic diagram of a structure of a network device according to an embodiment of this application. As shown in FIG. 10, the network device 10 in this embodiment may include one or more of a processing unit 11, a sending unit 12, and a receiving unit 13. The following describes the network device in this embodiment with reference to different application scenarios.

The network device in this embodiment may be applied to a handover scenario. In the handover scenario, the network device 10 in this embodiment may serve as a first network device. In this case, the network device 10 may include the processing unit 11, the sending unit 12, and the receiving unit 13. The processing unit 11 is configured to determine that a type of a first terminal device is a first type. The sending unit 12 is configured to send a handover request message. The handover request message includes first indication information, and the first indication information includes identifier information of the first type. The receiving unit 13 is configured to receive a handover acknowledgment message or a handover preparation failure message.

In a possible implementation, the first indication information further includes key-value indication information. The key-value indication information is used to indicate that the second network device rejects the handover in a first condition.

In a possible implementation, the receiving unit 13 is specifically configured to receive the handover acknowledgment message from the second network device, where the second network device supports a terminal device of the first type; or receive a first handover preparation failure message from the second network device, where the first handover preparation failure message includes failure information corresponding to the first type, and the second network device does not support a terminal device of the first type.

In a possible implementation, the sending unit 12 is specifically configured to send the handover request message to the second network device; or send the handover request message to the second network device by using an access and mobility management function AMF device.

The network device in this embodiment may be configured to implement the communication methods performed by the first network device in the method embodiments shown in FIG. 3 and FIG. 4. Implementation principles and technical effects thereof are similar, and details are not described herein again.

In the handover scenario, the network device 10 in this embodiment may alternatively serve as a second network device. In this case, the network device 10 may include the receiving unit 13 and the sending unit 12. The receiving unit 13 is configured to receive a handover request message. The handover request message includes first indication information. The first indication information includes identifier information of a first type. The first type is a first type of a terminal device, or the first type is a type of a first terminal device. The sending unit 12 is configured to send a handover acknowledgment message or a handover preparation failure message.

In a possible implementation, the handover request message further includes capability information of the first terminal device, and the type of the first terminal device is the first type.

In a possible implementation, the first indication information further includes key-value indication information. The key-value indication information is used to indicate that the second network device rejects the handover in a first condition.

In a possible implementation, the receiving unit 13 is specifically configured to receive the handover request message sent by a first network device; or receive the handover request message from a first network device by using an access and mobility management function AMF device.

The network device in this embodiment may be configured to implement the communication methods performed by the second network device in the method embodiments shown in FIG. 3 and FIG. 4. Implementation principles and technical effects thereof are similar, and details are not described herein again.

The network device in this embodiment may alternatively be applied to a cell selection scenario, a cell reselection scenario, or an ANR scenario. In this scenario, the network device 10 may include the processing unit 11 and the sending unit 12. The processing unit 11 is configured to generate a system message. The system message includes second indication information. The second indication information is used to indicate a first type. The first type is a first type of a terminal device. The sending unit 12 is configured to send the system message.

In a possible implementation, the second indication information is used to indicate that a cell of a network device allows a terminal device of the first type to camp on.

In a possible implementation, the second indication information is used to indicate whether a cell of a network device allows a terminal device of the first type to camp on.

In a possible implementation, the second indication information is further used to indicate whether the cell of the network device allows the terminal device of the first type to perform intra-frequency reselection.

In a possible implementation, the system message is a system information block SIB1.

The network device in this embodiment may be configured to implement the communication methods performed by the network device in the method embodiments shown in FIG. 5 to FIG. 7. Implementation principles and technical effects thereof are similar, and details are not described herein again.

The network device in this embodiment may alternatively be applied to a capability interaction scenario of a terminal device. In this scenario, the network device 10 may include the receiving unit 13 and the processing unit 11. The receiving unit 13 is configured to receive capability information from a first terminal device. The capability information includes third indication information. The processing unit 11 is configured to determine, based on the third indication information, that a type of the first terminal device is a first type or a second type.

In a possible implementation, the network device 10 may further include the sending unit 12. The sending unit 12 is configured to send a capability request message to the first terminal device.

The network device in this embodiment may be configured to implement the communication method performed by the network device in the method embodiment shown in FIG. 8. Implementation principles and technical effects thereof are similar, and details are not described herein again.

The network device in this embodiment may alternatively be applied to an Xn interface setup scenario. In the Xn interface setup scenario, the network device 10 in this embodiment may serve as a first network device. In this case, the network device 10 may include the receiving unit 13 and the sending unit 12. The sending unit 12 is configured to send an Xn interface setup request message to a second network device. The Xn interface setup request message includes query information, and the query information is used to query whether the second network device supports a terminal device of a first type. The receiving unit 13 is configured to receive an Xn interface setup response message or an Xn interface setup failure message from the second network device. The Xn interface setup response message includes fourth indication information, and the fourth indication information is used to indicate whether the second network device supports the terminal device of the first type.

The network device in this embodiment may be configured to implement the communication method performed by the first network device in the method embodiment shown in FIG. 9. Implementation principles and technical effects thereof are similar, and details are not described herein again.

In the Xn interface setup scenario, the network device 10 in this embodiment may alternatively serve as a second network device. In this case, the network device 10 may include the receiving unit 13 and the sending unit 12. The receiving unit 13 is configured to receive an Xn interface setup request message from a first network device. The Xn interface setup request message includes query information, and the query information is used to query whether the second network device supports a terminal device of a first type. The sending unit 12 is configured to send an Xn interface setup response message or an Xn interface setup failure message to the first network device. The Xn interface setup response message includes fourth indication information, and the fourth indication information is used to indicate whether the second network device supports the terminal device of the first type.

The network device in this embodiment may be configured to implement the communication method performed by the second network device in the method embodiment shown in FIG. 9. Implementation principles and technical effects thereof are similar, and details are not described herein again.

Figure 11:
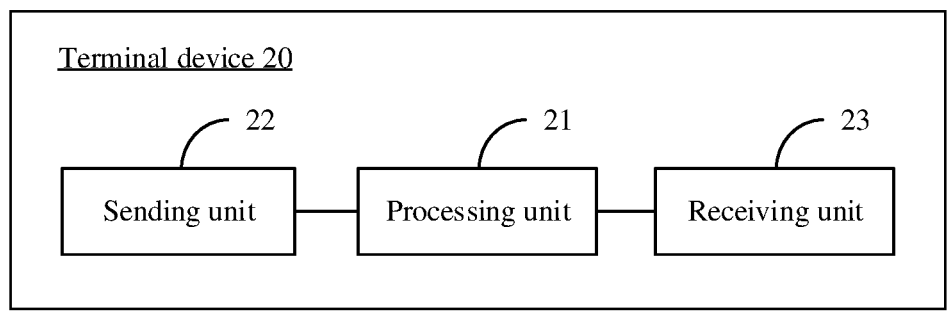
FIG. 11 is a schematic diagram of a structure of a terminal device according to an embodiment of this application.

An embodiment of this application provides a communication apparatus. The communication apparatus may be a terminal device or an element in the terminal device, for example, a chip or an integrated circuit. The following uses a terminal device as an example for description. A person skilled in the art may learn that the following terminal device may be replaced with a communication apparatus such as a chip or an integrated circuit. FIG. 11 is a schematic diagram of a structure of a terminal device according to an embodiment of this application. As shown in FIG. 11, the terminal device 20 in this embodiment may include one or more of a processing unit 21, a sending unit 22, and a receiving unit 23. The following describes the terminal device in this embodiment with reference to different application scenarios.

The terminal device in this embodiment may be applied to a cell selection scenario, a cell reselection scenario, or an ANR scenario. In this scenario, the terminal device 10 in this embodiment may serve as a first terminal device. In this case, the terminal device 10 may include the receiving unit 23 and the processing unit 21. The receiving unit 23 is configured to receive a system message from a network device. The processing unit 21 is configured to obtain second indication information from the system message.

The second indication information is used to indicate a first type. The first type is a first type of a terminal device.

In a possible implementation, the system message is a system information block SIB1.

In a possible implementation, the processing unit 21 is further configured to determine, depending on whether the second indication information is obtained from the system message, whether camping on a cell of the network device is allowed; or determine, based on the second indication information obtained from the system message, whether camping on a cell of the network device is allowed.

In a possible implementation, the processing unit 21 is specifically configured to obtain the second indication information from the system message, and determine that camping on the cell of the network device is allowed; or obtain no second indication information from the system message, and determine that camping on the cell of the network device is not allowed.

In a possible implementation, the processing unit 21 is specifically configured to: when the second indication information indicates that the cell of the network device allows a terminal device of the first type to camp on, determine that camping on the cell of the network device is allowed; or when the second indication information indicates that the cell of the network device does not allow a terminal device of the first type to camp on, determine that camping on the cell of the network device is not allowed.

In a possible implementation, the processing unit 21 is further configured to determine, based on the second indication information, whether intra-frequency reselection is allowed.

In a possible implementation, the processing unit 21 is further specifically configured to: when the system message has the second indication information, and sixth indication information indicates that the intra-frequency reselection is allowed in the cell of the network device, determine that the intra-frequency reselection is allowed; or when the system message has the second indication information, and sixth indication information indicates that the intra-frequency reselection is not allowed in the cell of the network device, determine that the intra-frequency reselection is not allowed.

In a possible implementation, the system message further includes frequency band information and bandwidth information that are supported by the network device. The processing unit 21 is specifically configured to determine, depending on whether the second indication information is obtained from the system message, and the frequency band information and the bandwidth information that are supported by the network device, whether camping on the cell of the network device is allowed; or determine, based on the second indication information, and the frequency band information and the bandwidth information that are supported by the network device, whether camping on the cell of the network device is allowed.

In a possible implementation, the network device is a network device corresponding to a neighbor cell of a serving cell of the first terminal device. The terminal device 10 may further include the sending unit 22. The sending unit 22 is configured to send the second indication information to a network device corresponding to the serving cell.

The terminal device in this embodiment may be configured to implement the communication methods performed by the terminal device in the method embodiments shown in FIG. 5 to FIG. 7. Implementation principles and technical effects thereof are similar, and details are not described herein again.

The terminal device in this embodiment may alternatively be applied to a capability interaction scenario of a terminal device. In this scenario, the terminal device 20 may include the sending unit 22 and the processing unit 21. The processing unit 21 is configured to generate capability information. The capability information includes third indication information. The third indication information is used to indicate a type of a first terminal device. The type of the first terminal device is a first type or a second type. The sending unit 22 is configured to send the capability information to a network device.

In a possible implementation, the terminal device 20 may further include the receiving unit 23. The receiving unit 23 is configured to receive a capability request message from the network device.

The terminal device in this embodiment may be configured to implement the communication method performed by the terminal device in the method embodiment shown in FIG. 8. Implementation principles and technical effects thereof are similar, and details are not described herein again.

Figure 12:
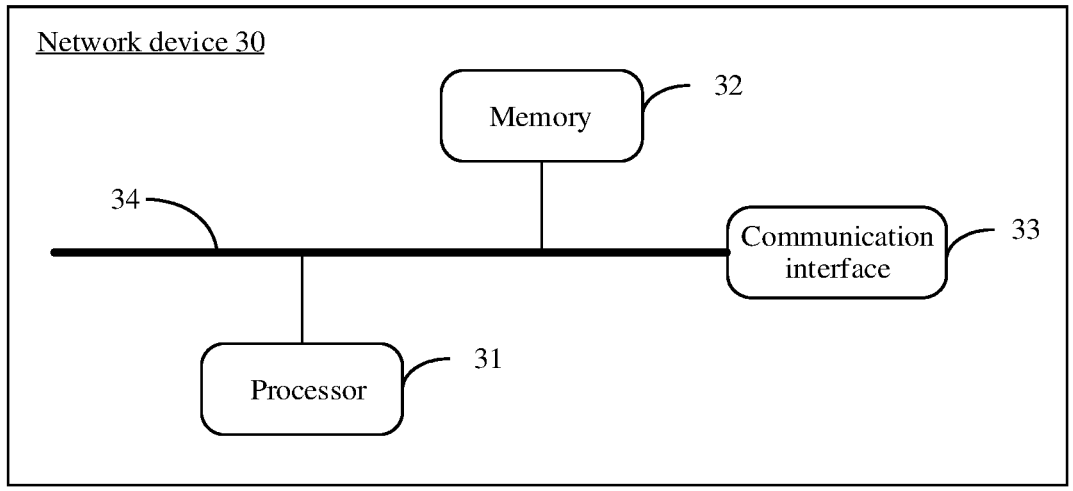
FIG. 12 is a schematic diagram of a structure of a network device according to an embodiment of this application.

FIG. 12 is a schematic diagram of a structure of a network device according to an embodiment of this application. As shown in FIG. 12, the network device 30 in this embodiment may include a processor 31, a memory 32, and a communication interface 33. There may be one or more processors 31. There may be one or more memories 32.

The memory 32 is configured to store a computer program. The communication interface 33 is configured to perform data communication or signal communication with another network device or terminal device. The processor 31 is configured to execute the computer program stored in the memory 32, to implement the communication methods performed by the first network device in the method embodiments shown in FIG. 3 and FIG. 4, the communication methods performed by the second network device in the method embodiments shown in FIG. 3 and FIG. 4, the communication methods performed by the network device in the method embodiments shown in FIG. 5 to FIG. 7, the communication method performed by the network device in the method embodiment shown in FIG. 8, the communication method performed by the first network device in the method embodiment shown in FIG. 9, or the communication method performed by the second network device in the method embodiment shown in FIG. 9.

Optionally, the memory 32 may be independent, or may be integrated with the processor 31. When the memory 32 is a component independent of the processor 31, the network device 30 may further include a bus 34, configured to connect the memory 32 and the processor 31.

In a possible implementation, the processing module 11 in FIG. 10 may be integrated into the processor 31 for implementation, and the receiving module 13 and the sending module 12 may be integrated into the communication interface 33 for implementation.

In a possible implementation, the processor 31 may be configured to implement a signal processing operation of the network device in the foregoing method embodiments, and the communication interface 33 may be configured to implement a signal receiving and sending operation of the network device in the foregoing method embodiments.

The network device provided in this embodiment may be configured to perform the method performed by the network device in the foregoing method embodiments, and implementation principles and technical effects of the network device are similar to those of the network device in the foregoing method embodiments. Details are not described herein again.

Figure 13:
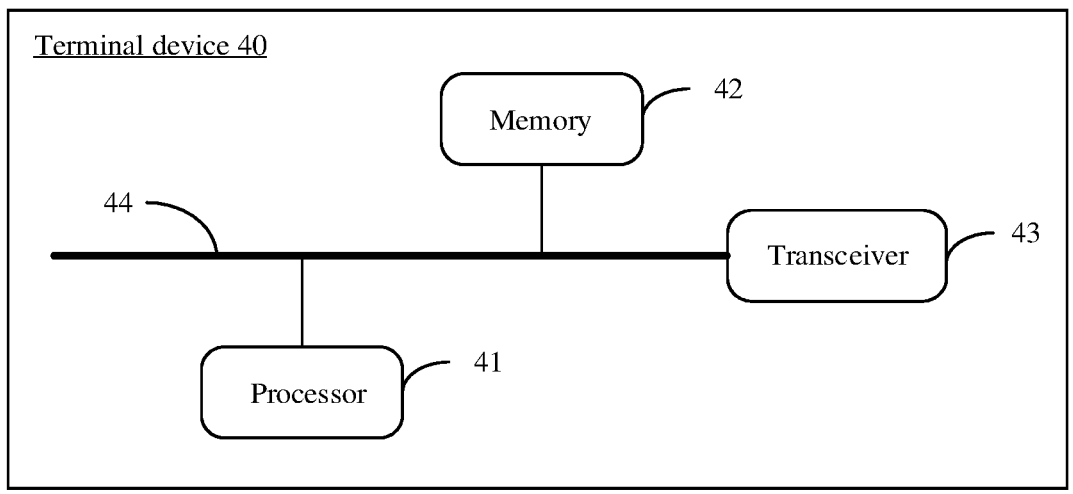
FIG. 13 is a schematic diagram of a structure of a terminal device according to an embodiment of this application.

FIG. 13 is a schematic diagram of a structure of a terminal device according to an embodiment of this application. As shown in FIG. 13, the terminal device 40 in this embodiment includes a processor 41, a memory 42, and a transceiver 43. There may be one or more processors 41. There may be one or more memories 42.

The memory 42 is configured to store a computer program. The transceiver 43 is configured to perform data communication or signal communication with a network device. The processor 41 is configured to execute the computer program stored in the memory 42, to implement the communication methods performed by the terminal device in the method embodiments shown in FIG. 5 to FIG. 7, or the communication method performed by the terminal device in the method embodiment shown in FIG. 8.

Optionally, the memory 42 may be independent, or may be integrated with the processor 41. When the memory 42 is a component independent of the processor 41, the terminal device 40 may further include a bus 44, configured to connect the memory 42 and the processor 41.

In a possible implementation, the processing module 21 in FIG. 11 may be integrated into the processor 41 for implementation, and the receiving module 23 and the sending module 22 may be integrated into the transceiver 43 for implementation.

In a possible implementation, the processor 41 may be configured to implement a signal processing operation of the terminal device in the foregoing method embodiments, and the transceiver 43 may be configured to implement a signal receiving and sending operation of the terminal device in the foregoing method embodiments.

The terminal device provided in this embodiment may be configured to perform the method performed by the terminal device in the foregoing method embodiments, and implementation principles and technical effects of the terminal device are similar to those of the terminal device in the foregoing method embodiments. Details are not described herein again.

An embodiment of this application provides a computer storage medium. The computer storage medium includes a computer program, and the computer program is used to implement the method performed by the network device in the foregoing method embodiment, or implement the method performed by the terminal device in the foregoing method embodiment.

An embodiment of this application further provides a chip or a chip system. The chip or the chip system includes at least one processor and a communication interface. The communication interface and the at least one processor are connected by using a line. The at least one processor is configured to run a computer program or instructions, to implement the method performed by the network device in the foregoing method embodiment or the method performed by the terminal device in the foregoing method embodiment.

The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

An embodiment of this application further provides a computer program product. The computer program product includes computer program code. When the computer program code is run on a computer, the computer is enabled to perform the method performed by the network device in the foregoing method embodiment or the method performed by the terminal device in the foregoing method embodiment.

An embodiment of this application further provides a communication system, including a first network device and a second network device. The first network device and the second network device may use the structure shown in FIG. 10 or FIG. 12. In some scenarios, the first network device and the second network device may implement the communication method shown in FIG. 3 or FIG. 4. In some other scenarios, the first network device and the second network device may implement the communication method shown in FIG. 9.

An embodiment of this application further provides a communication system, including a network device and a terminal device. The network device may use the structure shown in FIG. 10 or FIG. 12, and the terminal device may use the structure shown in FIG. 11 or FIG. 13. In some scenarios, the network device and the terminal device may be configured to implement the communication methods shown in FIG. 5 to FIG. 7. In some other scenarios, the network device and the terminal device may be configured to implement the communication method shown in FIG. 8.

In the several embodiments provided in this application, it should be understood that the disclosed device and method may be implemented in other manners. For example, the described device embodiment is merely an example. For example, division into the modules is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all the modules may be selected according to actual needs to achieve the objectives of the solutions of embodiments.

In addition, functional modules in embodiments of this application may be integrated into one processing unit, or each of the modules may exist alone physically, or two or more modules are integrated into one unit. The unit formed by the modules may be implemented in a form of hardware, or may be implemented in a form of hardware in addition to a software functional unit.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) or a processor to perform some of the steps of the methods described in embodiments of this application.

It should be understood that the foregoing processor may be a central processing unit (CPU), or may be another general-purpose processor, a digital signal processor (DSP), an application-specific integrated circuit (ASIC), or the like.

The general-purpose processor may be a microprocessor, or the processor may be any conventional processor or the like. The steps of the methods disclosed with reference to the present invention may be directly implemented by a hardware processor, or may be implemented by a combination of hardware and a software module in a processor.

The memory may include a high-speed RAM memory, or may include a non-volatile memory NVM such as at least one magnetic disk memory, or may include a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. Buses may be classified into an address bus, a data bus, a control bus, and the like. For ease of representation, the bus in the accompanying drawings of this application is not limited to only one bus or only one type of bus.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or a special-purpose computer.

For example, a storage medium is coupled to a processor, so that the processor can read information from the storage medium or write information into the storage medium. Certainly, the storage medium may be a component of the processor. The processor and the storage medium may be located in an application-specific integrated circuit (ASIC). Certainly, the processor and the storage medium may alternatively exist in an electronic device or a controlling device as discrete components.

What is claimed is:

1. A method, comprising:
    generating a system message, wherein, if the system message comprises second indication information, the second indication information indicates a first type, wherein the first type is a first type of a terminal device, wherein a terminal device of the first type is a reduced capability (REDCAP) terminal device, wherein the second indication information indicates whether a cell of a network device allows the terminal device of the first type to perform intra-frequency reselection, and wherein if the system message does not comprise the second indication information, the system message indicates that camping on a cell of the network device is not allowed for a REDCAP terminal device; and
    sending the system message by the network device to the terminal device.

2. The method according to claim 1, wherein the system message is a system information block SIB1.

3. The method according to claim 1, wherein a bandwidth supported by the reduced capability terminal devices is less than 20 MHz, and a peak data rate supported by the reduced capability terminal devices is in a range of 5 Mb/s to 10 Mb/s.

4. The method according to claim 1, wherein a value of the second indication information indicates that the intra-frequency reselection is allowed or not allowed.

5. A method, comprising:
    receiving a system message from a network device, wherein,
    if the system message comprises the second indication information, the second indication information indicates a first type, wherein the first type is a first type of a terminal device, wherein a terminal device of the first type is a reduced capability (REDCAP) terminal device, determining, based on the second indication information, whether allow the terminal device of the first type to perform intra-frequency reselection; and
    if the system message does not comprise the second indication information, determining that camping on a cell of the network device is not allowed for a REDCAP terminal device.

6. The method according to claim 5, wherein the system message is a system information block SIB1.

7. The method according to claim 5, further comprising:
    determining that camping on a cell of the network device is allowed in response to the second indication information indicating that the cell of the network device allows terminal devices of the first type to camp on the cell of the network device; and
    determining that camping on a cell of the network device is not allowed in response to the second indication information indicating that the cell of the network device does not allow terminal devices of the first type to camp on the cell of the network device.

8. The method according to claim 5, wherein a value of the second indication information indicates that the intra-frequency reselection is allowed or not allowed.

9. An apparatus, comprising:
    one or more processors; and
    a non-transitory memory configured to store program instructions that are executable by the one or more processors;
    wherein when executed by the one or more processors, the program instructions cause the apparatus to perform:
        generating a system message, wherein, if the system message comprises second indication information, the second indication information indicates a first type, wherein the first type is a first type of a terminal device, wherein a terminal device of the first type is a reduced capability (REDCAP) terminal device, wherein the second indication information indicates whether a cell of a network device allows the terminal device of the first type to perform intra-frequency reselection, and wherein, if the system message does not comprise the second indication information, the system message indicates that camping on a cell of the network device is not allowed for a REDCAP terminal device; and
        sending the system message to the terminal device.

10. The apparatus according to claim 9, wherein the system message is a system information block SIB1.

11. The apparatus according to claim 9, wherein a bandwidth supported by the reduced capability terminal devices is less than 20 MHz, and a peak data rate supported by the reduced capability terminal devices is in a range of 5 Mb/s to 10 Mb/s.

12. The apparatus according to claim 9, wherein a value of the second indication information indicates that the intra-frequency reselection is allowed or not allowed.

13. An apparatus, comprising:
    one or more processors; and
    a non-transitory memory configured to store program instructions;
    wherein when executed by the one or more processors, the program instructions cause the apparatus to perform:

receiving a system message from a network device, wherein, if the system message comprises second indication information, the second indication information indicates a first type, wherein the first type is a first type of a terminal device, wherein a terminal device of the first type is a reduced capability (RED-CAP) terminal device, determining, based on the second indication information whether allow the terminal device of the first type to perform intra-frequency reselection; and if the system message does not comprise the second indication information, determining that camping on a cell of the network device is not allowed for a REDCAP terminal device.

14. The apparatus according to claim 13, wherein the system message is a system information block SIB1.

15. The apparatus according to claim 13, further comprising:

determining that camping on a cell of the network device is allowed in response to the second indication information indicating that the cell of the network device allows terminal devices of the first type to camp on the cell of the network device; and determining that camping on a cell of the network device is not allowed in response to the second indication information indicating that the cell of the network device does not allow terminal devices of the first type to camp on the cell of the network device.

16. The apparatus according to claim 13, wherein a value of the second indication information indicates that the intra-frequency reselection is allowed or not allowed.

* * * * *

UNITED STATES PATENT AND TRADEMARK OFFICE
CERTIFICATE OF CORRECTION

| | |
|---|---|
| PATENT NO. | : 12,425,940 B2 |
| APPLICATION NO. | : 17/901413 |
| DATED | : September 23, 2025 |
| INVENTOR(S) | : Xin et al. |

It is certified that error appears in the above-identified patent and that said Letters Patent is hereby corrected as shown below:

In the Claims

In Column 55, in Claim 13, Line 8, delete "information whether allow" and insert -- information, whether to allow --.

Signed and Sealed this
Twenty-first Day of October, 2025

John A. Squires
*Director of the United States Patent and Trademark Office*